US008725604B2

(12) United States Patent
Knighton

(10) Patent No.: US 8,725,604 B2
(45) Date of Patent: May 13, 2014

(54) METHOD AND SYSTEM FOR COLLECTING AND PROCESSING ELECTRONIC DATA

(75) Inventor: Michael Knighton, Lewisville, TX (US)

(73) Assignee: Thomson Reuters (Tax & Accounting) Services, Inc., Carrollton, TX (US)

( * ) Notice: Subject to any disclaimer, the term of this patent is extended or adjusted under 35 U.S.C. 154(b) by 518 days.

(21) Appl. No.: 12/589,392

(22) Filed: Oct. 22, 2009

(65) Prior Publication Data

US 2010/0217694 A1    Aug. 26, 2010

Related U.S. Application Data

(60) Provisional application No. 61/196,986, filed on Oct. 22, 2008.

(51) Int. Cl.
*G06F 17/22* (2006.01)
*G07F 19/00* (2006.01)

(52) U.S. Cl.
USPC ............. 705/31; 715/213; 715/221; 715/229; 715/234

(58) Field of Classification Search
None
See application file for complete search history.

(56) References Cited

U.S. PATENT DOCUMENTS

| 5,189,608 | A  | * | 2/1993  | Lyons et al. | 705/30  |
|-----------|----|---|---------|--------------|---------|
| 7,627,504 | B2 | * | 12/2009 | Brady et al. | 705/31  |
| 7,650,355 | B1 | * | 1/2010  | Davis        | 715/234 |
| 7,805,420 | B2 | * | 9/2010  | Kapoor et al. | 707/695 |
| 2003/0050883 | A1 | * | 3/2003  | Weir et al. | 705/35  |
| 2008/0016041 | A1 | * | 1/2008  | Frost et al. | 707/3   |
| 2009/0282324 | A1 | * | 11/2009 | Patel        | 715/212 |
| 2009/0300474 | A1 | * | 12/2009 | Asplund et al. | 715/213 |

* cited by examiner

*Primary Examiner* — Luna Champagne
(74) *Attorney, Agent, or Firm* — Valenti, Hanley & Robinson, PLLC; Kevin T. Duncan

(57) ABSTRACT

The present invention provides a system and method of generating a set of tax schedule information comprising: (a) providing an Excel interface, the Excel interface being associated with a set of commands and functions; (b) accessing a separate database, the separate database storing a set of data, the set of data having been defined using the set of commands and functions; (c) manipulating the set of data according to the set of commands and functions to generate the set of tax schedule information; and (d) storing the set of tax schedule information in a separate database. This embodiment may further include one or more of the following: using at least one entry from the set of tax schedule information to populate a tax schedule; wherein the separate database is an XML database; wherein the set of tax schedule information is based, at least in part, on a set of tags associated with the XML database.

16 Claims, 33 Drawing Sheets

FIGURE 5

| File | Edit | View | Insert | Format | Tools | Data | Window | Help | DataFlow | Excel Sign Off | FormsFlow |

Tax/Accounting tick marks> Mathematical Symbols> Reference Nos. >Reference Ltrs> Sign-off>  — 446

I_0001  ▼  *fx*  Southwest Manufacturing — 472

476 —  This worksheet can be duplicate — 470

Legal Entity: Southwest Manufacturing — 464

Legal Information

468

Name & Address of
Person with custody of
the books and records

Address _____
City _____  State/Province _____  Zip/Postal Code ____
Country ____

Name & Address of Corp
statutory or resident
agent in country of incorp

Name _____
Address _____
City _____  State/Province _____  Zip/Postal Code ____
Country ____

Director of Corporation _____

Any officers or directors US
citizens or residents

Name ____

Name & Address &
identifying number of branch
office or agent in the US

Name ____
Address _____

INCOME TAX

MY WORK
WORKFLOW BROWSER
DOCUMENT
DATAFLOW — 422
CONTROL LOG
CALENDAR
ENTITY/TOPIC BROWSER

SETUP
⊕ ⊘ ⊗ — 430
Workflows
  DataFlow
  FormsFlow Template — 440
Users — 434
  bobbyboy@gmail.com
  irving.malcolm@gmail.com — 436
  km.gunther@gmail.com Group Codes — 438
Security
Reports User Properties          Welcome Bob Irving    490    Actions Login (user@domain.com):  irving.malcolm@gmail.com
Full Name:                Irving Malcolm
Password (Minimum 8 Characters):
Verify Password:

User must change password at next logon: ☐
Force password change every # of days: ☐ [ ] day(s)
Group Code: [ Germany     ▽ ]
Disable User/Comments: ☐ [          ]
Account expires on: ☐ [ ▦ ]

Groups
Administrators
Scan Operators
TAX
TEST
Training-Income Tax Only

▲
▼

DATAFLOW

[ Save ] [ Cancel ]

FIGURE 8

| Entity/Topic Name | Template Name | Year | Status | Assigned To | Reminder Sent | Created By |
|---|---|---|---|---|---|---|
| Cylinders Far East | 2006 International 5471 | 2008 | Not Started | Bob Irving | 03/14/08 | Bob Irving |
| CM, Ltd. | Legal Entity Template | 2008 | In Progress | Bob Irving | 04/11/08 | Bob Irving |
| Southwest Manufacturing AG | Legal Entity Template | 2008 | Completed | Irving Malcolm | | Bob Irving |
| Munster Oben | Legal Entity Template | | | Irving Malcolm | 04/30/08 | Bob Irving |
| Southwest Manufacturing AG | 2006 International 5741 | | | Karen Gunther | 04/21/08 | Sandia Dougla |
| Munster Oben | 2006 International 5741 | | | Karen Gunther | 03/24/08 | Sandia Dougla |
| Bayern Equipment | 2006 International 5741 | | | Karen Gunther | 04/21/08 | Sandia Dougla |
| Hamburg Cylinders | 2006 International 5741 | | | Karen Gunther | 04/21/08 | Sandia Dougla |
| Saarland Cylinders | 2006 International 5741 | | | Karen Gunther | 04/21/08 | Sandia Dougla |
| Munich Equipment | 2006 International 5741 | | | Karen Gunther | 04/11/08 | Sandia Dougla |
| Potsdam Cylinders | Legal Entity Template | | | Karen Gunther | | Mike Knighton |

Popup menu:
- New dataflow request
- Delete dataflow request
- Send reminders
- Dataflow notes
- Change request status
- Dataflow documents
- Assign user
- Request history
- Export
- Customize view
- Save preferences
- Save preferences for all

Select Entity (Step 1 of 3)

New Data Flow Request

| Entity/Topic Name | Entity/Topic ID |
|---|---|
| ⊞ ☐ Group Code: Germany — 542 | |
| ⊟ ☐ Group Code: Health Companies — 544 | |
| ☐ Health Arizona | 1234 |
| ☐ Health New Mexico | 4567 |
| ☐ Health Florida — 546 | 2345 |
| ☐ Health California | 3456 |
| ⊞ ☐ Group Code: Malaysia | |
| ⊞ ☐ Group Code: Spain | |
| ⊞ ☐ Group Code: Test | |
| ⊞ ☐ Group Code: Training | |

Select Template (Step 2 of 3)

New Data Flow Request

| Template Name 552 | W/F Process | Tax Type | 554 Year | 556 Period |
|---|---|---|---|---|
| ☐ Best Practices Intl Request | Federal Income Tax Ret... | FEDERAL INCOME | 2008 ˅ | 1/31 ˅ |
| ☐ International Request | Foreign Information Rep... | FEDERAL INCOME | 2008 ˅ | 1/31 ˅ |
| ☐ Tax Package Sampler | Foreign Information Rep... | FEDERAL INCOME | 2008 ˅ | 1/31 ˅ |
| ☐ Test 092008 | Federal Income Tax Ret... | FEDERAL INCOME | 2008 ˅ | 1/31 ˅ |
| ☐ Training Doc 1 | Federal Income Tax Ret... | FEDERAL INCOME | 2008 ˅ | 1/31 ˅ |

[<< Previous] [Next >>] [Cancel]

Figure 10B

Assign User (Step 3 of 3) 560

New Data Flow Request

| Entity/Topic Name | Entity/Topic ID 544 | Template Name | W/F Process | Tax Type | Year | Period | Assigned To |
|---|---|---|---|---|---|---|---|
| ☐ Group Code | Health Companies 562 | | | | | | |
| Health California | 3456 | Training Doc 1 | Federal Inco... | FEDERAL... | 2008 | 1/31 | Fred Fortune 564 |
| ☐ Notify via Email 546 | | | | | | | |

[<< Previous] [Finish] [Cancel]

Figure 10C

| | tlr.CWTProdSupport | Reminder Legal Entities - DataFlow Reminder Just a reminder that we need inform | Apr 30 |
|---|---|---|---|
| | tlr.CWTProdSupport | Legal Entity Information Submitted - DataFlow Request Completion Notification | Apr 28 |
| | tlr.CWTProdSupport (2) | Legal Entity Information Needed - New DataFlow Request Please fill out this reque | Apr 24 |

Legal Entity Information Needed   Inbox | X tlr.CWTProdSupport@thomson.com   New Dataflow request please   Apr 24 (12 days ago)  ↰ Reply ▼

From  tlr.CWTProdSupport@thomson.com   Hide details   Apr 24 (12 days ago)

Reply-to  bob@jwmdemo4.com,
irving.malcolm@gmail.com

Date  Thu, April 24, 2008 at 12:21 PM

Subject  Legal Entity Information Needed

Mailed-by  thomson.com

New DataFlow Request

Please fill out this request. We need info on all new legal entities that have been created this period.

| Entity/Topic Name | Entity/Topic ID | Tax Type | Template Name | Legal Entity Template | Year | Period |
|---|---|---|---|---|---|---|
| Munster Oben | 7001 | FEDERAL INCOME | Legal Entity Template | Tax Provision | 2008 | 1/31 |

( DataFlow Login )

Compose Mail

Inbox (1)
Starred
Chats
Sent Mail
Drafts
All Mail
Spam
Trash
Contacts

>Chat

>Labels

| Stock Information | | | |
|---|---|---|---|
| Shareholder | Stock Class | # of Shares 12/31/2006 | # of Shares 12/31/2007 |
| | | | |

Figure 17

Additional Comments

Figure 18

Formsflow Designer

| Tools | | | | |
|---|---|---|---|---|
| Convert To Web Form | | | | |
| D | E | F | | |
| | | | | |
| | | | | |

| Reports |
|---|
| Cell Names |
| Add Rows Group |
| Fit Text |
| Duplicating Page |
| Pre-conversion Diagnostics |
| Remove Pre-Conversion Diagnostics Report |

Fig. 20

| Name & Address of Person with custody of the books and records | Name | |
|---|---|---|
| | I_NameCustOfBk | |
| | Address | |
| | I_MailAdd | |
| | City | State/Province |
| | I_MailCity | I_MailState |
| | Country | |
| | I_MailCountry | |
| Name and Address of Corp statutory or resident agent in country of incorp | Name | |
| | I_RAName | |
| | Address | |
| | I_RAAddress | |
| | City | State/Province |
| | I_RACity | I_RAState |
| | Country | |
| | I_RACountry | |
| Director of Corporation | I_CorpDir | |

Figure 19

My DataFlow Requests

| Entity/Topic Name | Entity/Topic ID | Tax Type | Template Name | W/F Process | Year Period | Period | Status |
|---|---|---|---|---|---|---|---|
| Southwest Manufact... | 6435 | FEDERAL... | Legal Entity Tem... | Tax Provision | 2008 | 1/31 | Completed |
| Munter Oben | 7001 | FEDERAL... | Legal Entity Tem... | Tax Provision | 2008 | 1/31 | Not Started |

Download Formsflow Add-in
Change Password
Login

Dataflow

| Entity/Topic Name | Template Name | Year | Status | Assigned to | Reminder Sent |
|---|---|---|---|---|---|
| Cylinders Far East | 2006 International 5471 | 2008 | Not Started | Bob Irving | 03/14/08 |
| CM, Ltd. | Legal Entity Template | 2008 | In Progress | Bob Irving | 04/11/08 |
| Southwest Manufacturing AG | Legal Entity Template | 2008 | Completed | Irving Malcolm | |
| Munster Oben | Legal Entity Template | 2008 | Not Started | Irving Malcolm | 04/30/08 |
| Southwest Manufacturing AG | 2006 International 5741 | 2006 | Completed | Karen Gunther | 04/21/08 |
| Munster Oben | 2006 International 5741 | 2006 | In Progress | Karen Gunther | 03/24/08 |
| Bayern Equipment | 2006 International 5741 | 2006 | Not Started | Karen Gunther | 04/21/08 |
| Hamburg Cylinders | 2006 International 5741 | 2006 | Not Started | Karen Gunther | 04/21/08 |
| Saarland Cylinders | 2006 International 5741 | 2006 | Not Started | Karen Gunther | 04/21/08 |
| Munich Equipment | 2006 International 5741 | 2006 | In Progress | Karen Gunther | 04/11/08 |
| Potsdam Cylinders | Legal Entity Template | 2007 | In Progress | Karen Gunther | |
| Hesse Cylinders | 2006 International 5741 | 2006 | In Progress | Mike Knighton | 04/11/08 |
| CM, Ltd. | 2006 International 5741 | 2006 | Not Started | Rosemary Winthrop | 03/14/08 |

Figure 23

| | | | | | | | |
|---|---|---|---|---|---|---|---|
| 2 | | | | | | | |
| 3 | Template | | | | Reset Shaded Values | | |
| 4 | Template ID | | % | | | | |
| 5 | Tax Type | | % | | | | |
| 6 | Year | | 2006 | | | | |
| 7 | Period | | % | | | | |
| 8 | Status | | % | | | | |
| 9 | | | | | | | |
| 10 | Entity | | 6435|Southwest Manufacturing AG | | | | |
| 11 | | | | | | | |
| 12 | RequestID | | 14 | | | | |
| 13 | DFWriteCSV | | Ready to run | | | | |
| 14 | | | | | | | |
| 15 | | | Thousands Multiplier: | | N | | |
| 16 | Entity ID | Account | Field ID-Do Not Im | Description-Do Not Import | | Amount | Write to CSV |
| 17 | 6435 | 440000 | I CYSales | Sales Revenue | | -285545977 | TRUE |
| 18 | 6435 | 400030 | I CYService | Services Revenue | | 0 | FALSE |
| 19 | 6435 | 422222 | I CYReturns | Returns, Allowances and Rebates | | 0 | FALSE |
| 20 | 6435 | 440001 | I CYCOGS | Cost of Good Sold | | 135787926 | TRUE |
| 21 | 6435 | 400320 | I CYDivInc | Dividend Income | | -4901160 | TRUE |
| 22 | 6435 | 400321RP | I CYDivIncRP | Dividend Income from Related Parties | | 0 | FALSE |
| 23 | 6435 | 400150 | I CYIntInc | Interest Income | | -12827087 | TRUE |
| 24 | 6435 | 400150RP | I CYIntIncRP | Interest Income from Related Parties | | 0 | FALSE |
| 25 | 6435 | 444000 | I CYRentInc | Rental Income | | -761397 | TRUE |
| 26 | 6435 | 444000RP | I CYRentIncRP | Rental Income from Related Parties | | 0 | FALSE |
| 27 | 6435 | 444010 | I CYRoyalInc | Royalty Income | | 0 | FALSE |
| 28 | 6435 | 444010RP | I CYRoyalIncRP | Royalty Income from Related Parties | | 0 | FALSE |
| 29 | 6435 | 444020 | I CYLicInc | License Income | | 0 | FALSE |
| 30 | 6435 | 444020RP | I CYLicIncRP | License Income from Related Parties | | 0 | FALSE |
| 31 | 6435 | 577777 | I CYGainFA | Net Gain (Loss) on Sale of Fixed Asset | | 0 | FALSE |
| 32 | 6435 | 444445 | I CYRealFornExch | Realized Foreign Exchange Gains | | 0 | FALSE |
| 33 | 6435 | 444444 | I CYUnRealFornExd | Unrealized Foreign Exchange Gains | | 0 | FALSE |

DataFlow Functions / Sample Lists / Sample Income Stmnt&Balance Sht / .CSV File

Figure 26

| | Entity ID | Account | Field ID-Do Not Import | Description-Do Not Import | Amount |
|---|---|---|---|---|---|
| 1 | | | | | |
| 2 | 6435 | 440000 | I_CYSales | Sales Revenue | -28545977 |
| 3 | 6435 | 440001 | I_CYCOGS | Cost of Good Sold | 13578792б |
| 4 | 6435 | 400320 | I_CYDivInc | Dividend Income | -4901160 |
| 5 | 6435 | 400150 | I_CYIntInc | Interest Income | -12827087 |
| 6 | 6435 | 444000 | I_CYRentInc | Rental Income | -761397 |
| 7 | 6435 | 400410 | C_CYMiscInc | Total Other Miscellaneous Income | -17209099 |
| 8 | 6435 | 400340 | I_CYSalWage | Salaries and Wages not Deducted Elsewhere | 10151910 |
| 9 | 6435 | 555002 | I_CYIntExp | Interest Expense | 3858273 |
| 10 | 6435 | 500280 | I_CYDepn | Depreciation not Deducted Elsewhere | 6537019 |
| 11 | 6435 | 500003 | I_CYWHTax | Withholding Taxes | 10960447 |
| 12 | 6435 | 555556 | C_CYMiscDed | Total Other Miscellaneous Deductions | 46873064 |
| 13 | 6435 | 100100 | I_CYCash | Cash | 9301378 |
| 14 | 6435 | 100120 | I_CYAcctRec | Trade Notes and Accounts Receivable | 63988360 |
| 15 | 6435 | 110001 | I_CYAllowDA | Less: Allowance for Bad Debts | -1210855 |
| 16 | 6435 | 110002 | I_CYInventory | Inventories | 19178064 |
| 17 | 6435 | 100280 | | Total Other Current Assets | 11611274 |
| 18 | 6435 | 177777 | I_CYOthInv | Other Investments | 21307876 |

Figure 27

| Entity ID: | % | | | | | | | |
|---|---|---|---|---|---|---|---|---|
| Entity Name: | % | | | | | | | |
| Template Name: | % | | | | | | | |
| Template ID: | % | | | | | | | |
| Tax Type: | % | | | | | | | |
| Year: | % | | | | | | | |
| Period: | % | | | | | | | |
| Status: | % | | | | | | | |
| | | | | | | | | |
| Dfgetlist(B12, C2, C3, C4, C5, C6, C6,C7,C8,C9) | | | | | | | | |
| DataCollectionRequestId | EntityId | EntityName | ExcelTemplateName | TaxType | Year | Period | Status | |
| | 100 | 4685 | CM, Ltd. | Income Statement | FEDERAL | 2008 | 30-Jun | Completed |
| | 101 | 7001 | Munster Oben | Income Statement | FEDERAL | 2008 | 30-Jun | Completed |
| | 102 | 7002 | Hesse Cylinders | Income Statement | FEDERAL | 2008 | 30-Jun | Completed |
| | 103 | 7003 | Bayern Equipment | Income Statement | FEDERAL | 2008 | 30-Jun | Completed |
| | 104 | 7004 | Hamburg Cylinders | | FEDERAL | 2008 | 30-Jun | Not Started |
| | 105 | 7005 | Saarland Cylinders | | | | | |

Figure 31

| DataCollectionRequestId | EntityId | EntityName | ExcelTemplateName |
|---|---|---|---|
| 136 | 4567 | Health New Mexico | Tax Package Sample |
| 137 | 2345 | Health Florida | Tax Package Sample |
| 138 | 3456 | Health California | Tax Package Sample |
| 191 | 1234 | Health Arizona | |

=DFGetID(4567,,"Tax Package Sampler",,2008,"8/31")

Figure 32

| Get Values | Person with Custody of the Books | | | | | |
|---|---|---|---|---|---|---|
| | Name | Address | City | State/Province | Zip/Postal Code | Country |
| | I_NameCustOfBk | I_MailAdd | I_MailCity | I_MailState | I_MAILZIP | I_MailCountry |
| =DFGetValues(Lists!$D$5:$I$5,D6:I6) | Pramod | 1399 Hyde Park Road | Dallas | New Jersey | 87501 | USA |
| 10/4/2008 3:58:46 PM | Robert | 2525 Magnolia Ave | Dallas | New Jersey | 12345 | USA |
| 10/4/2008 3:58:46 PM | Diane | 1313 Mockingbird La | Dallas | New Jersey | 75899-1234 | USA |
| 10/4/2008 3:58:46 PM | Mihran | 1313 Mockingbird La | Dallas | New Jersey | 75899-1234 | USA |

Figure 34

| Person with Custody of the Books | | | | | | |
|---|---|---|---|---|---|---|
| | =DFGetValues(Lists!A13, $B$6:$B$11,C6:C11 | Robert | 10/4/2008 3:58:46 PM | 10/4/2008 3:58:46 PM | Diane | 10/4/2008 3:58:46 PM |
| I_NameCustOfBk | Pramod | | | | Mihran | |
| I_MailAdd | 1399 Hyde Park Road | 2525 Magnolia Ave | | | 1313 Mockingbird Lane | 1313 Mockingbird Lane |
| I_MailCity | Dallas | Dallas | | | Dallas | Dallas |
| I_MailState | New Jersey | New Jersey | | | New Jersey | New Jersey |
| I_MailZip | 87501 | | 12345 | 75899-1234 | | 75899-1234 |
| I_MailCountry | USA | | | USA | | USA |

Figure 35

| Detail for Misc Income | |
|---|---|
| =DFGetRepeatingValues(191,"1","CYMsInc",C7) | |
| CYMsInc.001 | 45000 |
| CYMsInc.002 | 56789 |
| CYMsInc.003 | 98033 |
| CYMsInc.004 | 288 |
| CYMsInc.005 | 456 |

Figure 36

| Partner List | |
|---|---|
| =DFGetMultiPageValues(198,"I","0007",$B$5) | |
| I.0007 | Partner 1 |
| P02.I.0007 | Partner 2 |
| P03.I.0007 | Partner 3 |
| P04.I.0007 | Partner 4 |
| P05.I.0007 | Partner 5 |

Figure 37

| K-1 Lines | | | K-1 Codes | | |
|---|---|---|---|---|---|
| =DFGetMultiPageValues(198,"line",$B$5) | | | | 10/4/2008 6:41:49 PM | |
| Line.001 | 3 Other net rental income (loss) | | Code.001 | | |
| Line.002 | 20 Other information | | Code.002 | | |
| P02.Line.001 | 2 Net rental real estate income (loss) | | P02.Code.001 | | |
| P02.Line.002 | 3 Other net rental income (loss) | | P02.Code.002 | | |
| P03.Line.001 | 19 Distributions | | P03.Code.001 | | |
| P03.Line.002 | 19 Distributions | | P03.Code.002 | | |
| P04.Line.001 | 10 Net section 1231 gain (loss) | | P04.Code.001 | H Recapture of investment credit | |
| P04.Line.002 | | | P04.Code.002 | | |
| P05.Line.001 | | | P05.Code.001 | A Cash and marketable securities | |
| | | | | B Other property | |

Figure 38

=DFGetXML(ControlB13,Sheet1!F5)

| | |
|---|---|
| DataCollectionRequestId | 136 |
| DataCollectionTemplateId | 21 |
| EntityName | Health New Mexico |
| EntityId | 4567 |
| TaxType | FEDERAL INCOME |
| TemplateName | Tax Package Sampler |
| WorkflowProcess | Foreign Information Reporting |
| Year | 2008 |
| Period | 31-Aug |
| URL1 | https://workflow.onesourcetax.com/ |
| Edit | |
| BSFuncCurr | US Dollars |
| BSThous | Yes |
| C_CurYrShares | 130000 |
| C_CYMiscDed | 0 |
| C_CYMiscInc | 0 |
| C_CYNetInc | 456098 |
| C_CYNetSales | 465698 |
| C_CYOthCurrAsset | 0 |
| C_CYOthNonCurrAssets | 58973 |

Figure 39

| =DFCreateTable(F1,B2-B9) | | 136 | DataCollectionRequestId | 136 |
|---|---|---|---|---|
| EntityID | % | 136 | DataCollectionTemplateId | 21 |
| EntityName | % | 136 | EntityName | Health New Mexico |
| ExcelTemplateName | %Taxsampler | 136 | EntityId | 4567 |
| TemplateID | % | 136 | TaxType | FEDERAL INCOME |
| Tax Type | % | 136 | TemplateName | Tax Package Sampler |
| Year | % | 136 | WorkflowProcess | Foreign Information Reporting |
| Period | % | 136 | Year | 2008 |
| Status | % | 136 | Period | 31-Aug |
| | | 136 | URL1 | https://workflow.onesourcetax.com/ |
| | | 136 | Edit | 1 |
| Clear Data | | 136 | BSFuncCurr | US Dollars |
| | | 136 | BSThous | Yes |
| | | 136 | C_CurYrShares | 130000 |

Figure 40

| Put Data | Name | Address | City | State/Province | Zip/Postal Code | Country |
|---|---|---|---|---|---|---|
| | I_NameCustOfBk | I_MailAdd | I_MailCity | I_MailState | I_MailZip | I_MailCountry |
| =DFPutValues(Lists!A13 | $D$13:$I$13,D14:I14 | | New York | | | |
| Ready to run | Herman | 1313 Mockingbird Lane | New York | | | |
| Ready to run | Lilly | | New York | | | |
| Ready to run | Fred | | New York | | | |

Figure 41

| Entity | | Health Arizona | | | | |
|---|---|---|---|---|---|---|
| RequestID | | 191 | | | | |
| DFWriteCSV | | =DFWriteCSV(TRIM(C8),A14:E122,F14:F122,1,FALSE) | | | | |
| | | Thousands Multiplier: | | | 1000 | Write to CSV |
| Entity ID | Account | Field ID-Do Not Impo | Description-Do Not Import | | Amount | |
| 1234 | 440000 | I_CYSales | Sales Revenue | | -360988000 | TRUE |
| 1234 | 400030 | I_CYService | Services Revenue | | -29000000 | TRUE |
| 1234 | 422222 | I_CYReturns | Returns, Allowances and Rebates | | -10000000 | TRUE |
| 1234 | 440001 | I_CYCOGS | Cost of Good Sold | | -134000000 | TRUE |
| 1234 | 400320 | I_CYDivInc | Dividend Income | | -29000000 | TRUE |
| 1234 | 400321RP | I_CYDivIncRP | Dividend Income from Related Parties | | -10000000 | TRUE |
| 1234 | 400150 | I_CYIntInc | Interest Income | | -75000000 | TRUE |
| 1234 | 400150RP | I_CYIntIncRP | Interest Income from Related Parties | | 0 | FALSE |
| 1234 | 444000 | I_CYRentInc | Rental Income | | -50000000 | TRUE |
| 1234 | 444000RP | I_CYRentIncRP | Rental Income from Related Parties | | 0 | FALSE |
| 1234 | 444010 | I_CYRoyalInc | Royalty Income | | -90000000 | TRUE |
| 1234 | 444010RP | I_CYRoyalIncRP | Royalty Income from Related Parties | | 0 | FALSE |
| 1234 | 444020 | I_CYLicInc | License Income | | -7000000 | TRUE |
| 1234 | 444020RP | I_CYLicIncRP | License Income from Related Parties | | 0 | FALSE |
| 1234 | 577777 | I_CYGainFA | Net Gain (Loss) on Sale of Fixed Asse | | -65000000 | TRUE |
| 1234 | 444445 | I_CYRealFornExch | Realized Foreign Exchange Gains | | 0 | FALSE |
| 1234 | 444444 | I_CYUnRealFornExch | Unrealized Foreign Exchange Gains | | 0 | FALSE |

Figure 42

| 4 | Excel Template Name | Tax Package Sampler | |
|---|---|---|---|
| 5 | TemplateID | % | |
| 6 | Tax Type | % | |
| 7 | Year | % | |
| 8 | Period | % | |
| 9 | Status | | |
| 10 | | | |
| 11 | List | | |
| 12 | DataCollectionRequestId | EntityId | EntityName | ExcelTemplateName |
| 13 | | 4567 | Health New Mexico | TaxPackageSample |
| 14 | | 2345 | Health Florida | TaxPackageSample |
| 15 | | 3456 | Health California | TaxPackageSample |
| 16 | | 1234 | Health Arizona | TaxPackageSample |

| RequestID | | | |
|---|---|---|---|
| File Name | Trial Balance File | | Batch Processing [X] [+] |
| DFWriteCSV | Ready to Run | | 'Write Batch to CSV'!$C$6 |
| | | | |
| | Thousands Multiplier: | | Y |
| Entity ID | Account | Field ID-Do Not Impo | Description-Do Not Import |
| 1234 | 440000 | I_CYSales | Sales Revenue |
| 1234 | 400030 | I_CYService | Services Revenue |
| 1234 | 422222 | I_CYReturns | Returns, Allowances and Rebates |
| 1234 | 440001 | I_CYCOGS | Cost of Good Sold |

Figure 46

| RequestID | | | | |
|---|---|---|---|---|
| FileName | Trial Balance File | | | |
| DFWriteCSV | Ready to run | | | 1000 Write to CSV |
| | | | | |
| | Thousands Multiplier: | 191 | Y | |
| EntityID | Account | Field ID-Do Not Impo | Description-Do Not Import | Amount | TRUE (($C$6,$C13)) |
| 1234 | 440000 | I_CYSales | Sales Revenue | =DFGetSingleValue | TRUE |
| 1234 | 400030 | I_CYService | Services Revenue | -29000000 | TRUE |

Figure 47

METHOD AND SYSTEM FOR COLLECTING AND PROCESSING ELECTRONIC DATA

CROSS-REFERENCE TO RELATED PATENT APPLICATIONS

This patent application claims priority to U.S. Provisional Patent Application No. 61/196,986, filed Oct. 22, 2008, entitled "METHOD AND SYSTEM FOR COLLECTING AND PROCESSING ELECTRONIC DATA," which is hereby incorporated by reference herein in its entirety.

FIELD OF THE INVENTION

The field of the invention relates generally to systems directed to the intake and maintenance of data and associated processing, documenting and reporting of data and processed data. More particularly, the invention relates to methods and systems for workflow management, creation and implementation including presenting data and data processes from a central facility to remote users and systems across a communications network.

BACKGROUND OF THE INVENTION

With the advent, prevalence and continuing development and adoption of electronic storage, databases and electronic media-implemented data collecting and processing, companies have increasingly relied on software/computer-based systems to bring about greater efficiency, automation and capacity in conducting business operations. Further, such technology is increasingly relied upon by businesses in handling compliance, tax reporting and other tasks. To more fully integrate technology with a company's workforce, software-based systems exist that include workflow processes to insure compliance issues are addressed in business operation. The workflows involve handling and presenting data to workers via computer-based workstations.

For large corporations, including those often referred to as "multinational corporations," that have operations spread out across many countries, continents, regions and related taxing authorities, it has long been a difficult task of managing, and responding timely to, operational matters such as tax reporting. This is especially true where sales, income, asset location, etc. must be allocated across such jurisdictions and must be estimated and continually revised over time as underlying sales, revenues, etc. data is finalized. It has long been important for companies in this situation to maintain reliable records supporting calculations and resulting inputs reported in such tax filings. A "paper-trail" is often difficult in the electronic domain where multiple users often remote from one another and within different operations locations are accessing, revising and writing-over underlying data. Such "versioning" of data and underlying processes associated with reporting are important aspects in a tax department's operations.

Financial scandals in the corporate world have resulted in heightened scrutiny of corporate tax departments by regulators and auditors. Companies are now learning that the level of efficiency with which the corporate tax department operates can significantly affect the accuracy of compliance reporting, which may impact a company's financial statements (for example, in the case of the FAS 109 tax provisions that shows up on the financial statement). In today's environment under tighter controls associated with recent financial legislation and regulation, e.g., the Sarbanes-Oxley Act and related compliance regulation, a company's internal controls and procedures are under the magnifying glass more than ever, giving tax accountants—from staff level to VP and CFO levels—much more to deal with in terms of responsibility and even personal liability. Compliance pressures and the need to respond swiftly and accurately to regulators are important considerations and are spurring corporate investment in IT and computer/software-based systems to oversee and track issues and assist in reporting. In the past, cost, maintenance and customization requirements for most solutions were significant barriers.

More recently, solutions have been designed specifically for corporate tax departments to integrate with tax software, including Internet-based solutions, and capable of providing a document management function. Tax departments are continually gathering, creating, editing, and routing documents throughout the organization. As companies expand and change, the process of tracking different versions of work papers, checklists, returns and other documents, as well as the underlying data, computations and formulas, becomes more and more arduous. This is especially difficult with multinational corporations having operations, facilities, branches, subsidiaries and other related entities spread out across disparate locations and jurisdictions as well as operations that involve a multiplicity of tax authorities. With a workflow and document management solution designed specifically for tax departments, employees are better able to organize, track, retrieve and manage all documentation, as well as review steps, in one easy to use system.

With the increasing importance of tax departments to the financial health of any organization, many corporations are taking considerable measures to implement workflow systems designed to both create efficiencies and protect the reputation of their business, through controlled and standardized processes. Tax departments have a wide array of responsibilities that are all tied to the financial health of an organization. Compliance responsibilities that have very specific due dates must be completed accurately and on time, or the organization may suffer penalties and fines. Improper planning or poor data gathering can result in errors that, in some cases, will impact a financial statement and even share price. Overburdened tax departments spend much of their time just getting the work done, and don't have enough resources to properly strategize on how to lower overall tax rates and impact their organization. With all this said, the entire process—especially for larger organizations with multiple offices around the globe—can be extremely difficult to manage. As a result, CFOs, Senior VPs of Tax, and VPs of Tax, are now looking for new ways to manage workflow, monitor projects, collaborate, gather data (i.e. tax packages, Schedule M (Form 990), tax adjustments, etc.) and track due dates—tasks typically completed manually through spreadsheets, databases or physical paperwork.

As a matter of importance with a tax department, tax events within a large organization often must be spread or allocated across the organization and must be estimated for periodic reporting. Often the reporting must be followed up with end-of period reporting that requires previously submitted data to be revised. In the event a report or filing submitted by a tax-paying entity is challenged by a taxing authority, then the entity must provide documentation to support its earlier filings and establish a reasonable basis for reporting the previously submitted data. Staff within organizations often prefer to use familiar programs and documents for gathering and inputting and processing data, such as Excel spreadsheet. Staff from operations from many jurisdictions may jointly input, access, revise and process the data. Workflow processes and systems may be used to route workflow steps to various staff in the data collection and tax reporting process. This may include "routing" flows that call upon multiple individuals to access, revise and otherwise manipulate a common spreadsheet. There is often overlap in the workflow processes that result in multiple persons accessing and revising the core spreadsheet. Because multiple users have access to a common spreadsheet and the data on that spreadsheet, as well as the underlying formulas and processes used in the spreadsheet to perform calculations related to the reporting of tax information, it is often impossible to go back in time and recreate, with any degree of certainty, the exact version of the document as it was used to generate the interim tax filing. This presents a compliance problem for many companies and leaves them susceptible to fines and penalties imposed by taxing authorities.

What is needed is a system that addresses the above mentioned problems and provides companies with a solution that provides staff and users with the comfort and familiarity of using Excel or similar such spreadsheet in inputting, revising, and updating data, while providing a more robust data storage and maintenance system that may be called upon to provide effective back-up documentation in the event of challenge or audit.

SUMMARY OF THE INVENTION

The present invention provides an effective way and system to receive, store, process, revise and distribute data and workflow processes across an organization comprised of multiple operations that span corporate and geographic borders. The present invention may be used in connection with a Web-based workflow and document management solution that manages corporate tax department internal processes.

The present invention may be used or integrated with tax software to enable direct input into the tax software from electronic files such as Excel—ensuring consistency and eliminating the need for re-keying and for protecting the business, managing internal controls, and liberating users from some of the compliance pressures that permeate day-to-day work. The invention helps provide coordination among related entities and departments and ensures company-wide consistency in process and procedures. Documents can be secured, with access restricted to assigned and authorized users. Versions of Excel and Word, for example, can be managed properly to avoid errors or use of invalid data. As staff, responsibilities and projects are moved around within an organization, and a consistent method for storing and retrieving documents reduces overhead and training and helps address concerns related to risk management and compliance.

Increasingly, CEOs and CFOs are concerned with compliance issues and how to implement and track procedures that insure practices and processes are in place to insure compliance. The invention may be used to provide document management and workflow solutions tailored to the tax department to provide built-in audit trail controls that let users access and view versions of data and/or documents. In addition the system may track those who viewed, changed or approved a dataset or document and when. For both internal control and complying with government regulations, a document management and workflow solution can enforce critical policies and procedures which may be built into workflows. Another concern is Audit Response. Responding to information document requests is a part of every tax department's daily life. The present invention may greatly reduce effort and time with an electronic document management solution.

The present invention may be used with systems that include a dataflow forms tool written in MS Excel® from Microsoft Corporation (popular tool for ad-hoc calculations and report generation in finance and tax used around the world). With this platform, end users can create sophisticated forms that contain input fields, data validation, data manipulation, table lookups, and advanced calculations. In the past, there have been attempts to create web-based data collection tools for the complex data required by tax and finance but these tools fell short, for instance, because they used HTML for forms creation and could not match the functionality users had grown to expect from Excel. Current Web applications can greatly extend the reach and collaboration of organizations and the Internet is a great tool tool for controlling the process of communicating both locally and globally.

In one embodiment the invention provides a method of generating a set of tax schedule information comprising: (a) providing an Excel interface, the Excel interface being associated with a set of commands and functions; (b) accessing a separate database, the separate database storing a set of data, the set of data having been defined using the set of commands and functions; (c) manipulating the set of data according to the set of commands and functions to generate the set of tax schedule information; and (d) storing the set of tax schedule information in a separate database. This embodiment may further include one or more of the following: using at least one entry from the set of tax schedule information to populate a tax schedule; wherein the separate database is an XML database; wherein the set of tax schedule information is based, at least in part, on a set of tags associated with the XML database.

A better understanding of the present invention will be had upon reference to the following description in conjunction with the accompanying drawings. These drawings should not be construed as limiting the present invention, but are intended to be exemplary and for reference.

BRIEF DESCRIPTION OF THE DRAWINGS

FIG. 5 is a screen shot of a FormsFlow Worksheet Template, a custom Excel file converted into a web-based format, which is sent in all Dataflow Requests.

FIG. 8 is a screen shot of the User Properties Form, which is accessible from the Users tab on the FormsFlow sidebar.

FIG. 9 is a screen shot of the DataFlow Grid and the DataFlow Actions menu, which provides information on specific DataFlow requests.

FIGS. 10A-10C are screen shots of a New Data Flow Request screen that illustrate the steps to send a new Data-Flow request.

FIG. 11 is a screen shot of an email notification of a Data-Flow request received by a DataFlow Provider.

FIG. 12 is a screen shot of the Excel Add-Ins menu, which can be used to install the FormsFlow Designer Excel Add-In.

FIG. 14 is a screen shot of a FormsFlow Worksheet Template and the Input Cells dialog box, illustrating how to define and mark input cells.

FIG. 15 is a screen shot of a FormsFlow Worksheet Template and the Assign Repeating Cell Name dialog box, illustrating how to select a range of input cells and assign them a shared name.

FIG. 16 is a screen shot of a FormsFlow Worksheet Template containing cells that have been automatically named by the Automatically Create Cell Name command.

FIG. 17 is a screen shot of Add Rows Group feature that illustrates how to add additional rows as needed in the FormsFlow Worksheet Template.

FIG. 18 is a screen shot of the Fit Text feature that illustrates how to change the cell size according to the length of user comments in the cell.

FIG. 19 is a screen shot of a Range Name Report generated automatically by the FormsFlow Designer in a new tab in the FormsFlow Worksheet Template.

FIG. 20 is a screen shot of is a screen shot of the FormsFlow Designer menu, which provides access to various tools and features.

FIG. 21 is a screen shot of the My DataFlow Requests Grid that illustrates how to download and install the FormsFlow Add-In.

FIG. 22 is a screen shot of a FormsFlow Worksheet Web-Based Excel Template that illustrates how to use the various features provided in the FormsFlow menu.

FIG. 23 is a screen shot of the DataFlow Grid that illustrates new DataFlow Requests appearing in the grid.

FIG. 26 is a screen shot of a FormsFlow Worksheet Template, illustrating the Retrieve Data From Server command provided in the DataFlow dropdown menu.

FIG. 27 is a screen shot of a FormsFlow Worksheet Template, illustrating the Retrieve Data From Server command provided in the DataFlow dropdown menu.

FIG. 31 is a screen shot of a cell containing one embodiment of the DFGetList function.

FIG. 32 is a screen shot of a cell containing one embodiment of the DFGetID function.

FIG. 33 is a screen shot of the value returned in the cell shown in FIG. 32 containing the DFGetID function.

FIG. 34 is a screen shot of cells containing one embodiment of the DFGetValues function.

FIG. 35 is a screen shot of cells containing one embodiment of the DFGetValues function.

FIG. 36 is a screen shot of a cell containing one embodiment of the DFGetRepeatingValues function.

FIG. 37 is a screen shot of cells containing one embodiment of the DFGetMultiPageValues function.

FIG. 38 is a screen shot of cells containing one embodiment of the DFGetMultiPageValues function.

FIG. 39 is a screen shot of a cell containing one embodiment of the DFGetXML function.

FIG. 40 is a screen shot of a cell containing one embodiment of the DFCreateTable function.

FIG. 41 is a screen shot of a cell containing one embodiment of the DFPutValues function.

FIG. 42 is a screen shot of a cell containing one embodiment of the DFWriteCSV function.

FIG. 46 is a screen shot of the Batch Processing dialogue box when actively selecting or editing the Cell to Hold the Current Request ID While Processing.

FIG. 47 is a screen shot of a formula that referencing the cell that contains the Request ID.

DETAILED DESCRIPTION OF THE INVENTION

Figure 1:
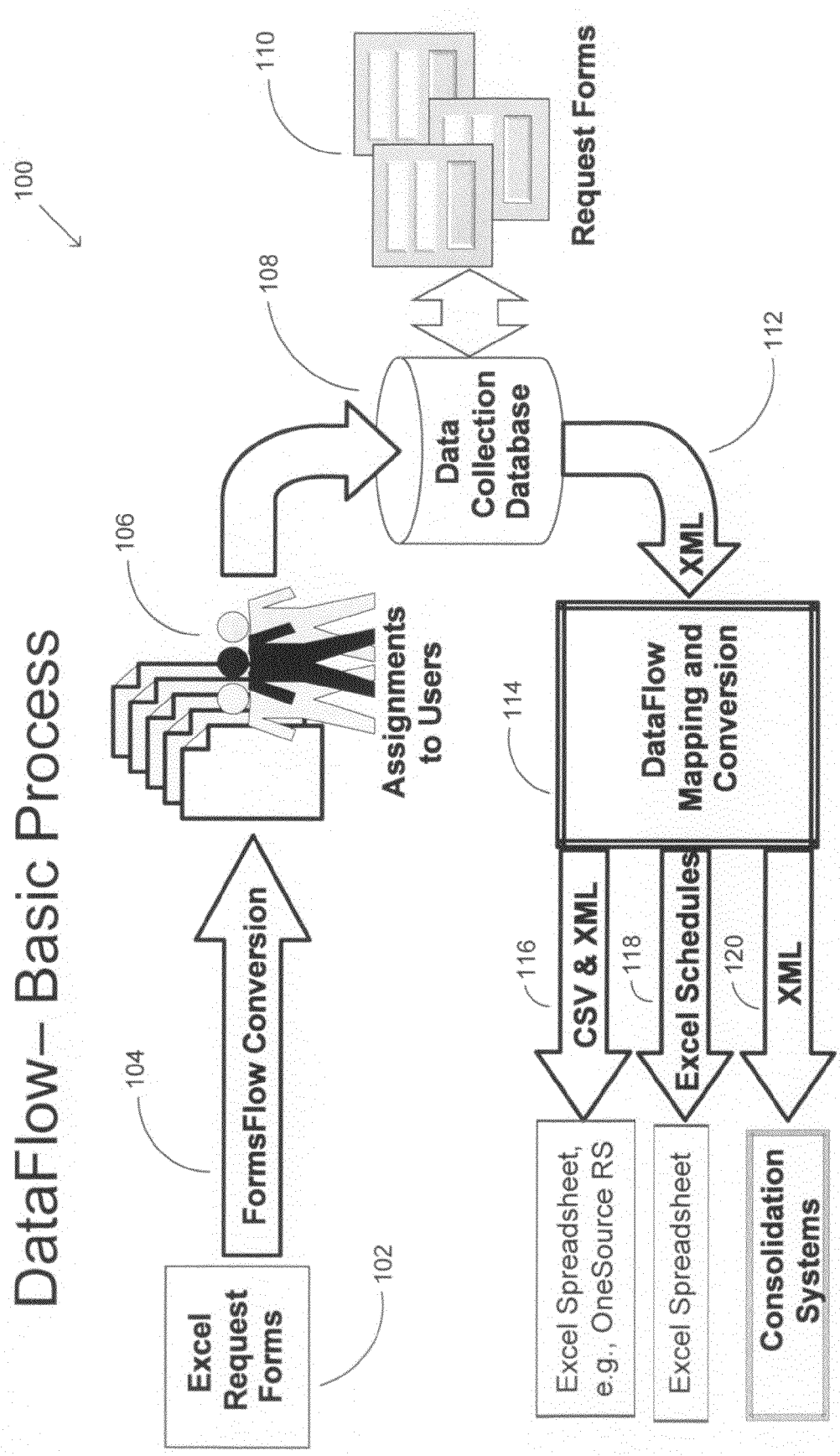
FIG. 1 is a flow chart of the basic DataFlow process showing end users interacting with web-based software to manage and process data requests.

The present invention will now be described in more detail with reference to exemplary embodiments as shown in the accompanying drawings. While the present invention is described herein with reference to the exemplary embodiments and applications, e.g., income tax environment, it should be understood that the present invention is not limited to such exemplary embodiments and applications. Those possessing ordinary skill in the art and having access to the teachings herein will recognize additional implementations, modifications, and embodiments, as well as other applications for use of the invention, which are fully contemplated herein as within the scope of the present invention as disclosed herein, and with respect to which the present invention could be of significant utility In describing the invention the specification shall, for purposes of explanation only and not by way of limitation, refer to certain software products of the Thomson Reuters Company, including OneSource™ Workflow Manager system, which may alternatively be referred to as InSource™ Workflow Manager, "OWM", and its components. For example, initially a user accesses the OWM by logging on via a password protected login page. After a user logs in, the OWM Fileroom Page opens. From this page, a user can link to other pages on OWM and can access via File Cabinet, as well as Reports, Administrative functions and Add-ins.

OneSource™ (InSource®) WorkFlow Manager (OWM) is a Web-based workflow and document management solution from Thomson Reuters Corporation that provides a true "mission control" for managing the entire corporate tax department. It is a secure, integrated solution that gives each member, from staff accountant to vice president, a portal-like view of all activities and documents. Although the invention is herein described in the context of exemplary embodiments and in the context of the exemplary OWM system, the invention is not limited to such an exemplary embodiments or systems. The OWM embodiment is used for illustrative purposes only.

OWM includes the following components and benefits. With Workflow Automation, tax departments can define and automate standard procedures and tasks for all tax-related workflows—including planning, provisions, tax compliance, and audit responses. Document & Workpaper Management function provides an integrated "virtual file room" that allows tax departments to "go paperless" and improve the storage and management of both scanned paper files and electronic files. OWM improves the process of creating and managing tax work papers. Tax Package Manager is designed to ease the process of data gathering and communications with individuals outside of the corporate tax department. With Calendaring and Reporting, an integrated tax calendar allows users to easily see what is due both internally and externally. With Risk Management, OWM assures that all tax returns, tax provision reportings, and other tax-related calculations and processes have been prepared and reviewed based on tax department procedures and internal control policies so that there is consistency. OWM platform is flexible, allowing tax departments to continuously add new workflows as they arise. Also, OWM seamlessly integrates with popular corporate tax software packages, including InSource® RS Income Tax software also provided by Thomson Reuters Corporation. OWM provides VP-level officers, managers, and staff of tax better insight into what's happening within the department, an efficient way to manage risk, and greater confidence that procedures and approvals have been followed.

OWM includes the DataFlow Component that is software that manages both the data and processes used in the collection of information, both numeric and textual, from disparate sources throughout an organization, including tax related information. OWM DataFlow uses forms tool written in MS Excel (popular tool for ad-hoc calculations and report generation in finance and tax used around the world). With this platform, end users can create sophisticated forms that contain input fields, data validation, data manipulation, table lookups, and advanced calculations. OWM DataFlow is a unique solution as it offers the workflow capabilities and reach of systems leveraging the Internet, the power and familiarity of Excel, and the sophistication of data storage using a SQL database.

One key to gathering data is the input form. Excel has long been the platform of choice for this process. OWM DataFlow includes a tool called FormsFlow that assists users in creating Excel-based data collection forms that can be integrated into the workflow environment. FormsFlow capabilities include: automatically determines input fields on a worksheet; naming of input fields (user option to specify a name or automatically name fields); Excel-based reports on field names used by the form; add rows ranges; specifies rows where users can add additional information to a protected worksheet (form); fit text ranges; allows users to expand "Comments" areas on the form to fit the text that has been entered; duplicating pages; allows users to add additional pages/duplicate pages to a form; automatic protection of forms; only allow users to input in designated input areas; form manipulation is limited to adding additional rows and expanding text blocks where designated by the form designer; specifying data to be transferred between FormsFlow requests; diagnostics to ensure that the forms are properly formatted; retrieving and loading data into the worksheet via the Internet from a central secure SQL database; sharing common data with multiple requests; simultaneous viewing and editing of the same request at multiple locations; optional local storage of input data for non-connected use; and run time available as both an Excel add-in as well as source VBA code to be inserted into end user forms (worksheets).

OWM Workflow capabilities (within the DataFlow module) include: Maintains list of entities/topics where work is being performed (i.e., company codes, entity IDs, names, etc.); groups entities by user-defined criteria; allows company to assign data collection requests to groups of companies or divisions rather than selecting them all individually; assigns individuals that are responsible for a group; stores multiple FormsFlow templates; maintains email templates for initial requests, reminders and notifications; E-mails coordinator when a user has completed a request, added a document, or requested assistance; notifies users that a request has been sent; automatically continues to remind users when there is an outstanding request; maintains a list of users that are DataFlow only (not counted for licensing purposes); intuitive wizard interface used to activate data requests; assign in batch-requests for multiple entities and multiple templates; assign users to entity groups or to individual requests; and import all setup information from Excel (CSV). The CSV file format is a Comma Separated Values File type that stores tabular data by using delimiters (characters designated to separate fields of data from one another). In this case, the CSV format mainly uses commas and double-quotes as delimiters. The CSV file, in short, is a basic way of expressing tabular data in textual format without the formatted structure of a table. Because of CSV's simple textual formatting, CSV files can be opened within simple text editors and can be easily transmitted and supported by a number of spreadsheet applications and databases. The CSV format is a very effective data exchange format. Users can convert Excel files to the simpler CSV format within the Microsoft Excel application by using the Save As option. Users can then access the Save As dialogue box which contains a list of alternative file formats. Among the file extensions offered, Microsoft Excel gives you the option of converting to Macintosh, MS-DOS or Delimited CSV file formats. By saving your file into any of these CSV formats, Microsoft Excel will export the first active Excel worksheet with the correct delimiters.

With reference to FIG. 1, the present invention provides enhanced functionality whereby end users can interact via web-based software to manage and process data requests. End users may fill out and submit forms they work with in Microsoft Excel worksheet. Data is temporarily loaded into an Excel worksheet for working on by the user but the data is actually stored on a database, e.g., SQL. The worksheet is only temporarily loaded with data from the central database. Excel stores data and formulas together so it is difficult to transport. When the user clicks save, the data is converted back to the database and the Excel worksheet is discarded. Formulas are discarded, but next time the user brings up the file, the formulas are associated with data in a template that is stored also in the central database and associated with a particular set of data. In this manner users across a global network of subsidiaries or service providers or related concerns can submit and access data and associated templates and formulas to recreate the Excel worksheet for further on-demand use. The system takes data and associates the data with a formula in a template so that multiple users across a large corporate organization can on an ad hoc basis access the data and template and recreate the working Excel worksheet for on-demand use. This is described in detail below.

Figure 2:
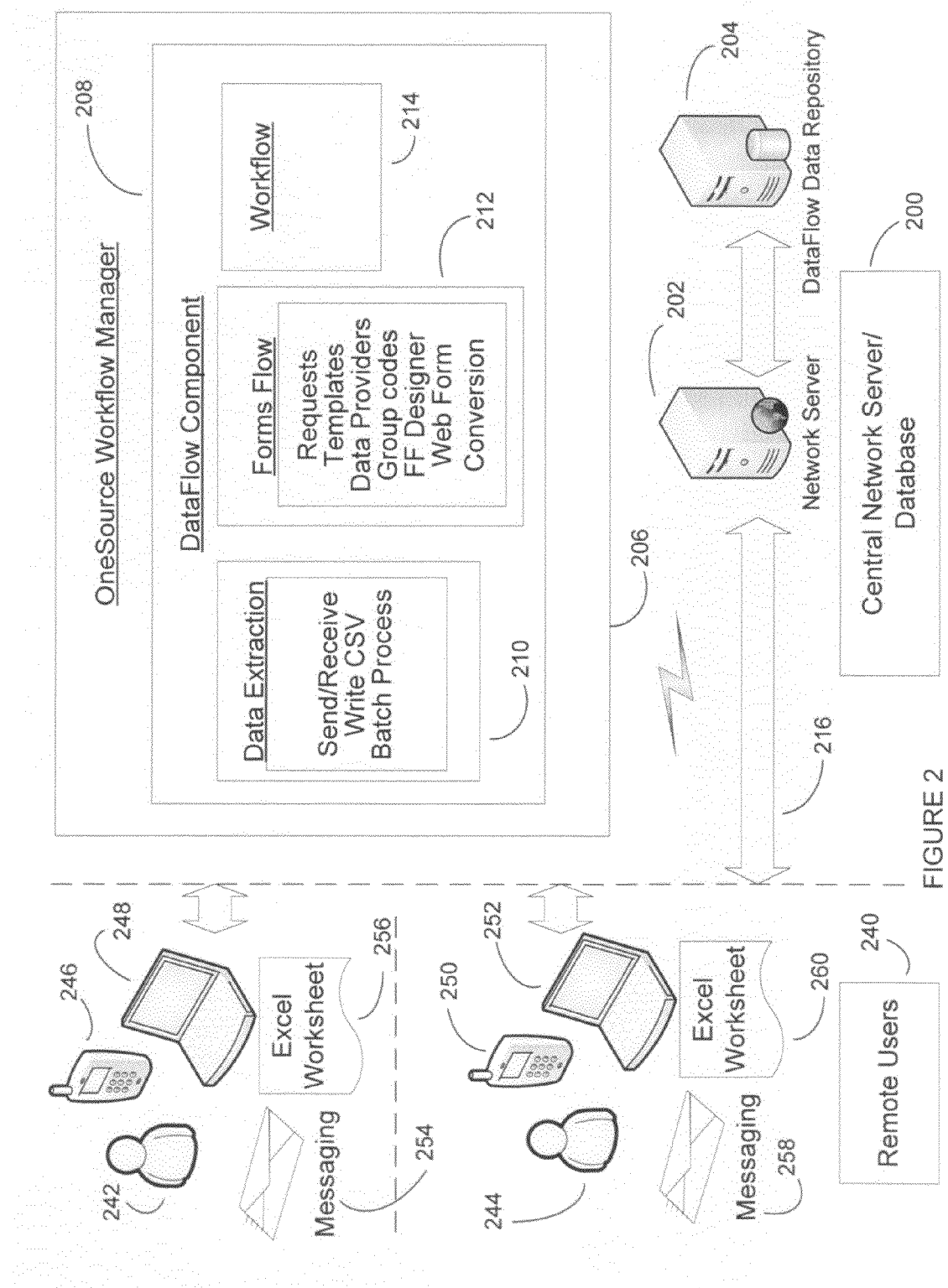
FIG. 2 is flow chart illustrating the computer-based system that provides remote access of databases and remote execution of a web-based workflow and document management solution.

With reference to FIG. 2, a computer-based system 200 includes a Central Network Server 202 and Database 204 are accessible via a network 216, such as the Internet, by remote users 240 (242,244). This may be by wired, optical fiber, wireless or a combination of such means. Executing on the Central Network Server 202 is a Web-based workflow and document management solution 206, such as the OneSource Workflow Manager OWM described above. The OWM includes a DataFlow Component 208 that includes Data Extraction 210, Forms Flow 212 and Workflow 214 capabilities/components. The particular functionality of the DataFlow Component and its sub-components is described in detail below. The remote users typically are computer-based and communicate with the OWM by way of one or more of computer workstations 248/252 and mobile or handheld processor-based device 246/250. Communications between the Central Network Server 202 and the remote users include the exchange of data and documents, including email notifications, requests, and data associated with Excel documents and/or web-converted versions of Excel documents.

Figure 3:
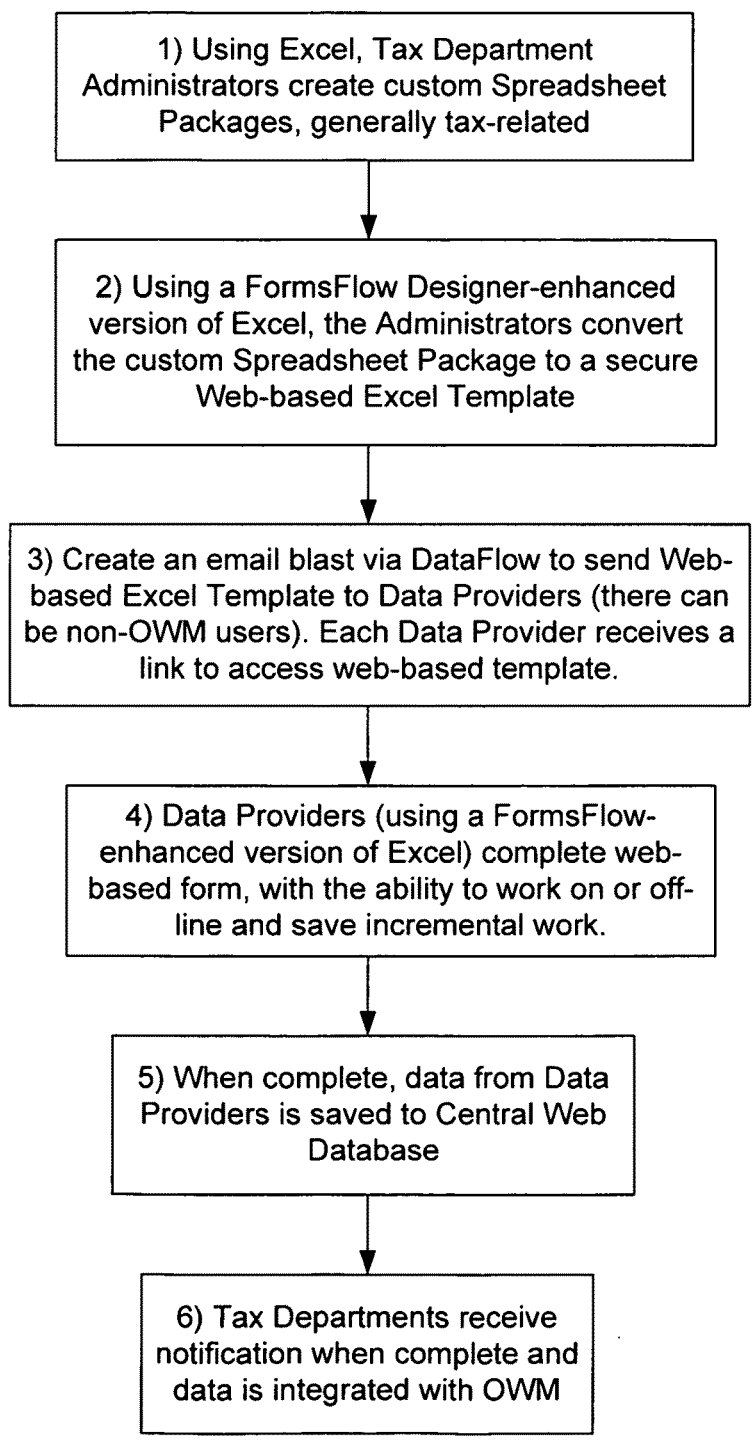
FIG. 3 is a block-diagram flow chart describing in greater detail the basic DataFlow process of FIG. 1.

FIG. 3 provides an overview of the DataFlow process described in more detail hereinbelow.

Figure 4:
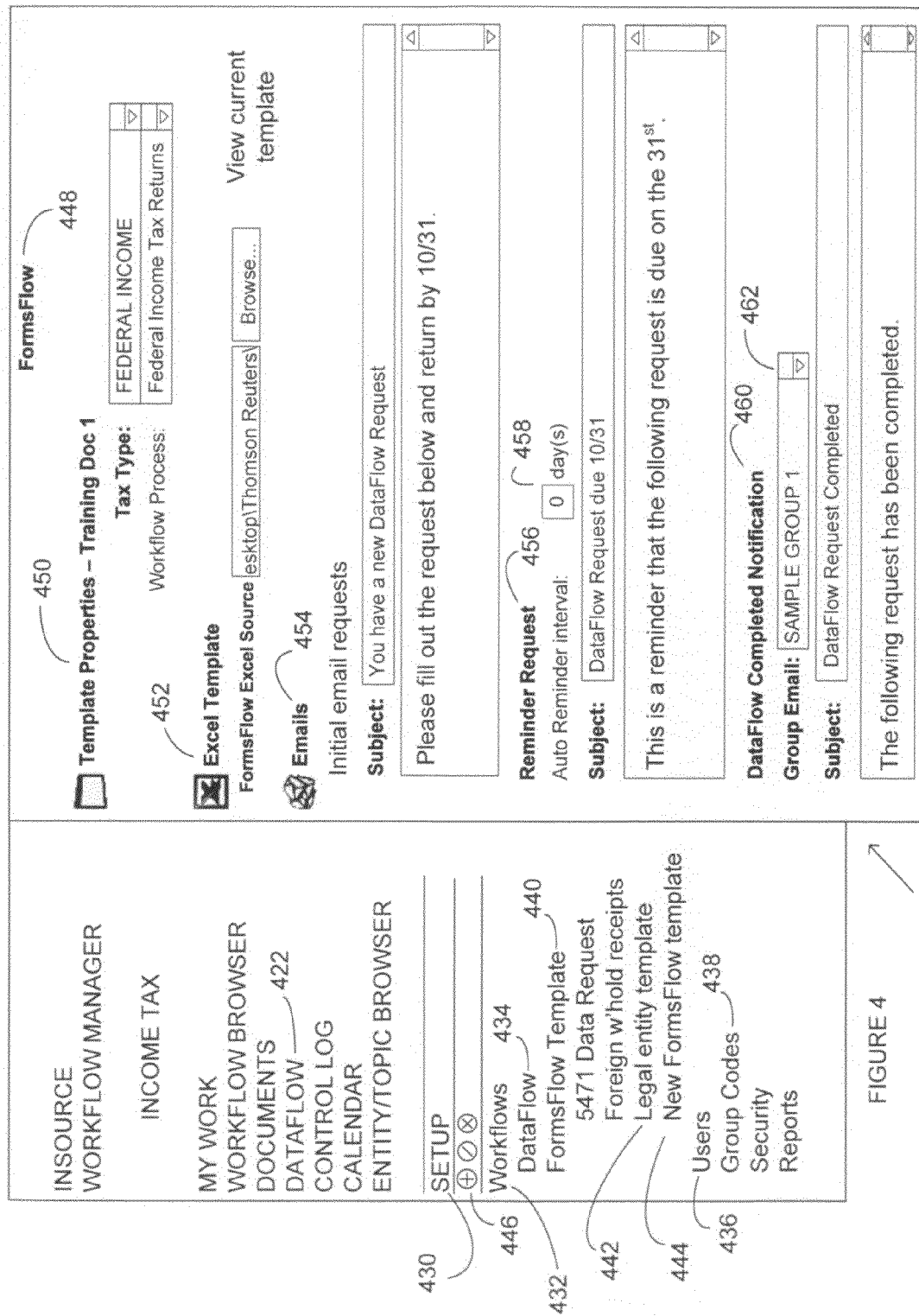
FIG. 4 is a screen shot of the FormsFlow Email Template and FormsFlow sidebar, a custom format for sending emails to Data Providers containing instructions, information, and files related to a request.

With reference to FIG. 4, the user may access the OWM DataFlow Module 208 of FIG. 2 to perform certain setup and tracking of DataFlow Requests among other business related tasks. The following are terms commonly used in describing aspects and functions of the OWM DataFlow Module. DataFlow Request—a request for information gathered by completing a secure web-based FormsFlow-enhanced Excel file. This Excel file is emailed to Data Providers who complete the form and the resulting data collection is securely stored in a Central Web Database for use by authorized Groups. Entity—The target of the DataFlow request. FormsFlow Templates—there are two types of templates referenced in DataFlow. The FormsFlow email Template is a custom format for sending emails detailing the FormsFlow Worksheet Template (see definition below) to be used, the instructions for the Data Providers, and the Tax Type and Workflow Process associated with the request. The FormsFlow Worksheet Template is a custom Excel file converted into a web-based format using FormsFlow Designer. It is the file that is sent in all DataFlow Requests. Data Providers complete these templates and save the requested information back to a secure Central Web Database. FormsFlow Designer is an Excel Add-In that allows the user to convert any Excel-based document into a secure, data-gathering format. Fields within the Excel spreadsheet are designated for user input and special characteristics, such as repeating rows and automatic text fit, are added. FormsFlow is an Excel Add-In that allows the Data Provider to complete a FormsFlow Worksheet Template and save the requested information back to a secure Central Web Database. "Group" refers to a class of individuals to which users of OWM's DataFlow module are assigned. The Groups are then assigned various security levels within OWM. Data Providers are individuals assigned to the DataFlow Request. These Data Providers are charged with the responsibility to complete the FormsFlow Worksheet Template and save the data to the Central Web Database. Data Providers can be either existing users of OWM or external. There are two types of users referenced in DataFlow. Data Providers are those individuals assigned to a DataFlow Request. If these individuals are external to OWM, they are added as Users in DataFlow Setup. Existing users of OWM in DataFlow can be either Data Providers or part of Groups notified upon completion of a DataFlow Request. These users are setup in the Administrative section of OWM.

In one manner of operation, once accessing the OWM system, a "MyWork" page associated with the particular user opens and the user may access the DataFlow module. The features of DataFlow, for example, may utilize two tabs on the WorkFlow Manager page: DataFlow and Setup. Each tab may be used to navigate to different functions. For example, the DataFlow tab may be used to 1) create a new DataFlow Request; 2) monitor the status of existing dataflow requests; and 3) access the DataFlow Actions Menu to make changes to individual requests, among other things. The Setup tab may be used to navigate to: 1) create FormsFlow Templates; 2) assign Group Codes; and 3) define Data Providers or Users (users who will complete the dataflow request), among other things.

Initiating a DataFlow Request—One key function performed upon set up is initiating a DataFlow Request. The administrator or central office sets up a template for each similar email blast. This FormsFlow email Template will link to a Tax Type and Workflow Process and be assigned to a Group email for notification upon completion. The DataFlow Request distributes this FormsFlow email Template to Data Providers or Users who will access, process and save the data to the Central Web Database. Once complete, the Admin Group can view and access the information provided.

In one exemplary manner, the following steps are completed to send a DataFlow Request related email request: 1) setup FormsFlow Email Template; 2) setup Group Codes; 3) setup Data Providers (Users); and 4) setup new DataFlow Request. Setting up a FormsFlow Template may include creating a new FormsFlow Template. FormsFlow Templates may be set-up by creating a new FormsFlow Template. With reference to exemplary screen shot 420 of FIG. 4, FormsFlow Templates are accessed through the Setup icon and menu 430. The user selects Setup 430, DataFlow 434, then FormsFlow Templates 440. The user may click the Add (+) button 446 at the top to add a new template. A new FormsFlow Template will be added to the list. Double click on new FormsFlow Template and rename the template. By selecting, for example, the Legal Entity Template button 442, the FormsFlow Properties screen 448 opens with fields/items in bold requiring user entries of data.

There are five parts to completing the FormsFlow Template (Email Request), 1) Template Properties 450; 2) Excel Template 452; 3) initial email Request 454; 4) Reminder Request 456; and 5) DataFlow Completed Notification 460. For Template Properties 450, the user selects the appropriate Tax Type and WorkFlow Process from the dropdown menu. Note that WorkFlow Process may be optional and that Tax Types and WorkFlow Process dropdown lists may be predefined. For Excel Template 452, the user browses to select the FormsFlow Workbook Template (the converted Excel workbook created by FormsFlow Designer discussed further hereinbelow) to be used for this project. Once selected, this file is saved to the Central Web Database or DataFlow Data Repository 204 of FIG. 2 for secure access by Data Providers and admin groups. For the Initial email Request 454, the user enters information that will be displayed in the email sent to Data Providers/Users when a new DataFlow Request is created or assigned to them. For the Reminder Request, the user enters information that will be displayed in the email sent to Data Providers when a reminder is sent. Note that if the user sets automatic reminder interval box 458 to anything other than 0, a reminder email will be automatically sent every predefined number of days to each user assigned a request using this template. For the DataFlow Completed notification, when the DataFlow request is complete, the information entered here will be displayed in the email sent to the users included in the Administrative Group selected in the Group email box. The user selects a Group from the dropdown list provided and may add/delete users or add a new Group. The user may click Save button at which point a dialog box appears confirming the template was successfully saved.

Figure 6A:
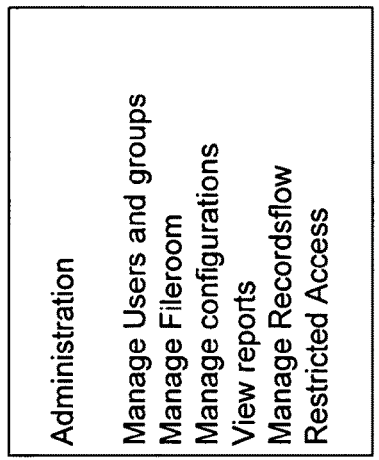
FIGS. 6A-6C are screen shots of the primary menu, Administration menu, and Manage Users and Groups menu that illustrate the steps for configuring the Group email list.
Figure 6B:
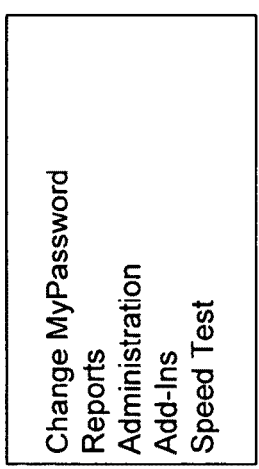
Figure 6C:
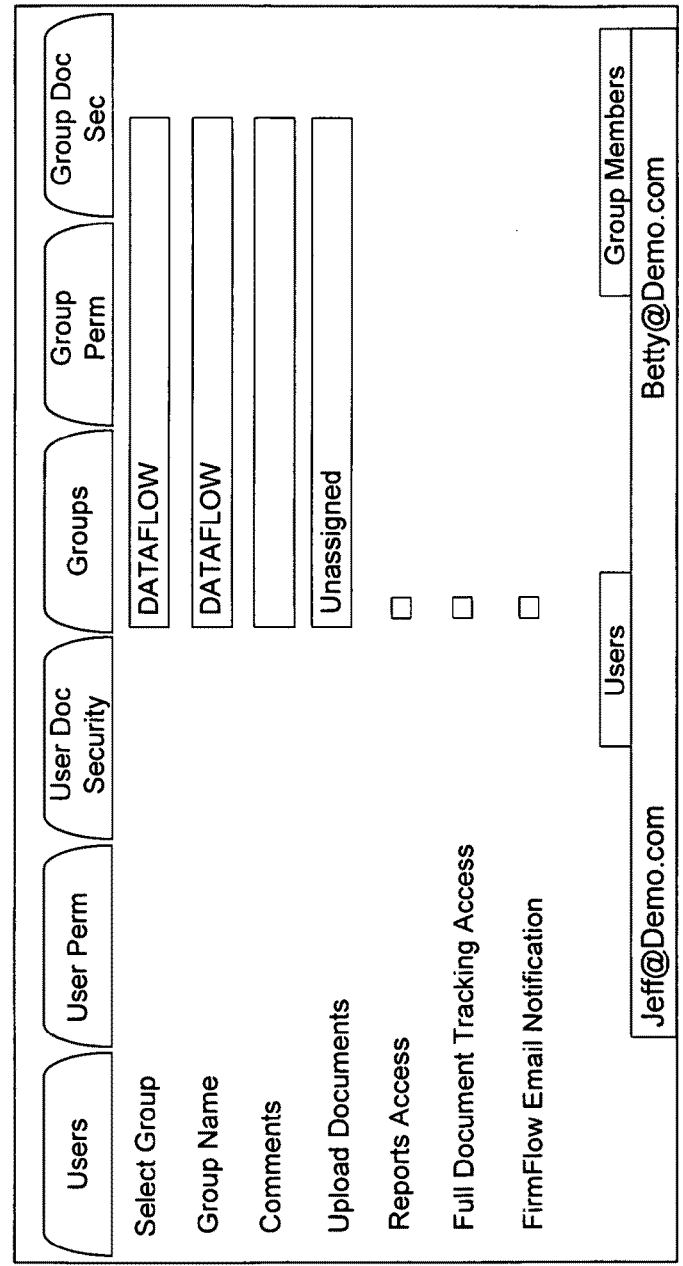

With reference to FIGS. 6A-6C, to configure the Group email list, the user selects the Administration link when logging into OWM and selects Manage Users and Groups. From the Groups tab, the user selects the Group assigned to the Group email on the FormsFlow email template page. The list of users in the Group Members section will receive the completion notification email when a Dataflow Request is changed to the Completed status. Add or delete users from Group Members lists as needed or create a new Group, if desired.

Figure 7:
FIG. 7 is a screen shot of the Group Codes Properties Form, accessible from the Workflow tab on the FormsFlow sidebar that illustrates the steps for adding a new entity to a group.

With reference to FIG. 7, Group Codes—to add an entity to a Group, the user opens Group Codes and clicks Add (+) to add a new Group Code, double-clicks on the new Group Code and rename/assign the name of the new group. The Group Code Properties Screen 480 opens and the user clicks on the lookup glass to select the Entities desired to be included in this Group Code. When a New Dataflow Request is set up, the user selects the subjects of these data requests from these Group Codes (and the entities within those Codes). The data is saved automatically. Group Codes can also be imported and exported using buttons on the setup bar.

With reference to FIG. 8, Data Providers—Data Providers are those individuals who will receive the dataflow request and fill in the data to be collected. These Data Providers can be either existing users of OWM or external. If the Data Provider is an existing user of OWM, their name will be available to be assigned to a Dataflow request. Non-OWM, or external, Data Providers will have to be added using the following procedure: From the Setup Menu 430, select DataFlow 434, then Users 436 and click Add (+) to enter a new User. Complete the User Properties Form 490 by logging in and assigning User, e.g., Irving Malcolm, to the appropriate Group Code, e.g., Germany; selecting an existing Administrative Group, e.g., DATAFLOW, to which the User will belong. Some security settings are maintained through these Groups. Click the Save button to complete the User Setup.

Security Levels for external Users—Each external user must be assigned to an Administrative Group which is used to control security settings in WorkFlow Manager. To create a new administrative group the user clicks the Administration link (FIG. 6A) when logged into OWM and selects Manage Users and Groups (FIG. 6B). From the Groups Tab (FIG. 6C) the user selects new Group from the Select Group dropdown and then enters a name for the new group and clicks the Save button. Next the user goes to OWM>Setup>DataFlow>Users and selects a user. The user then assigns the selected user to the new group created. To assign DataFlow Permissions, the user assigns DataFlow rights to the external users, navigates to OWM>Setup>Security>DataFlow Manager and assigns the New Group to the appropriate permissions specific to Dataflow.

New DataFlow Request—Referring to FIGS. 9 and 10A-10C, the user may send a DataFlow Request, for instance, by selecting new Data Request 520 from the DataFlow Actions menu 518. The new Data Request screen 540, FIG. 10A, appears and the user selects the entities for whom data is to be collected by Group Code 542 or the user can expand the Group Code field 544 and select a particular entity 546. The user then selects via screen 550 the FormsFlow Email Template from the template list 552 as well as the correct year 554 and period 556 the request will cover. Via screen 560 the user assigns a Data Provider/User (the person who will complete the request) 564 to the group 546 from the expanded group code 544 and assigns users to each entity 546. The DataFlow Request is sent to all Data Providers at this time. The new DataFlow request now appears in the DataFlow grid, see FIG. 9.

Working with the DataFlow grid—FIG. 9—The Dataflow Grid provides information on specific DataFlow requests, including: specifics of the DataFlow Request; Status (Completed, Not Started); and notes or Documents added. To open a Dataflow Request the user double clicks on the selected row. In one manner of operation, if the dataflow request status is Completed, it will open in read-only mode. To change the status of a DataFlow Request. The administrator may enter data or the data provider may go back into the request by first changing the status to something other than Completed and the user or or the data provider may enter data. To change the status the user accesses the DataFlow Actions Menu in the upper right corner of the screen; selects Change Request Status; and selects the new status.

To access notes, the user clicks on the row with the notes icon and select Actions, DataFlow notes. This will open the screen with a list of notes. The user selects the note and double clicks to open the note. The note may be displayed in the top right corner of the screen. The user edits the note, enters a resolution and closes the note. To access documents, the user clicks on the row with the Documents icon and selects Actions>DataFlow Documents. This will open a screen with a list of documents. The user double clicks to select a document from the grid. As the administrator, a user can also add or delete documents from the grid. To send reminders, the user selects the dataflow request from the grid and click on Actions>Send Reminder(s). This will send an e-mail to the Data Provider that is assigned the request with the reminder note previously setup in the FormsFlow email Template. To delete a DataFlow Request the user selects the row to be deleted and clicks on Actions>Delete DataFlow Request(s). To change an assigned User the user changes the Data Provider (or User) assigned to the dataflow request by: selecting the row, clicking Actions, Assign User and choosing a new Data Provider from the dropdown list.

The Request History option in the Actions Menu, allows users to see what activity has occurred on the specific DataFlow request. The report, shown below, indicates the time, data provider and actions performed on the template. The report can be exported. To customize the user's view of the DataFlow grid, the user selects Configure from the Actions Menu. The user may select any or all of the columns to appear.

FormsFlow Designer (FIGS. 12-19)—FormsFlow Designer is an Excel Add-In that allows users to convert Excel-based documents such as tax packages, questionnaires, and surveys, to a format that easily allows for communication and data collection throughout an organization and beyond. It works in conjunction with the optional DataFlow feature of OWM to deliver a user-configurable, secure, data-gathering system via the interne.

With FormsFlow Designer users designate fields within Excel spreadsheets for input by the data provider. Also this Add-In may be used to indicate which fields, if any, have special characteristics such as repeating rows and automatic text fit. In addition, users may mark an entire spreadsheet for "one-button" duplication. This can be very helpful, for example, when a series of duplicated input forms are needed for a series of Form 5471's.

The steps required in converting an Excel spreadsheet using FormsFlow Designer are as follows: 1) Install FormsFlow Designer excel Add-In; 2) Mark all input cells that data providers will complete; 3) name the cells in your worksheet, either automatically or manually; 4) Assign a similar cell name to a range of cells. This will allow use of macros with Excel to extract data at the end of the process. Users may also add special features: Add Rows, Fit Text and Duplicate Page and convert the workbook to web form.

Figure 12:
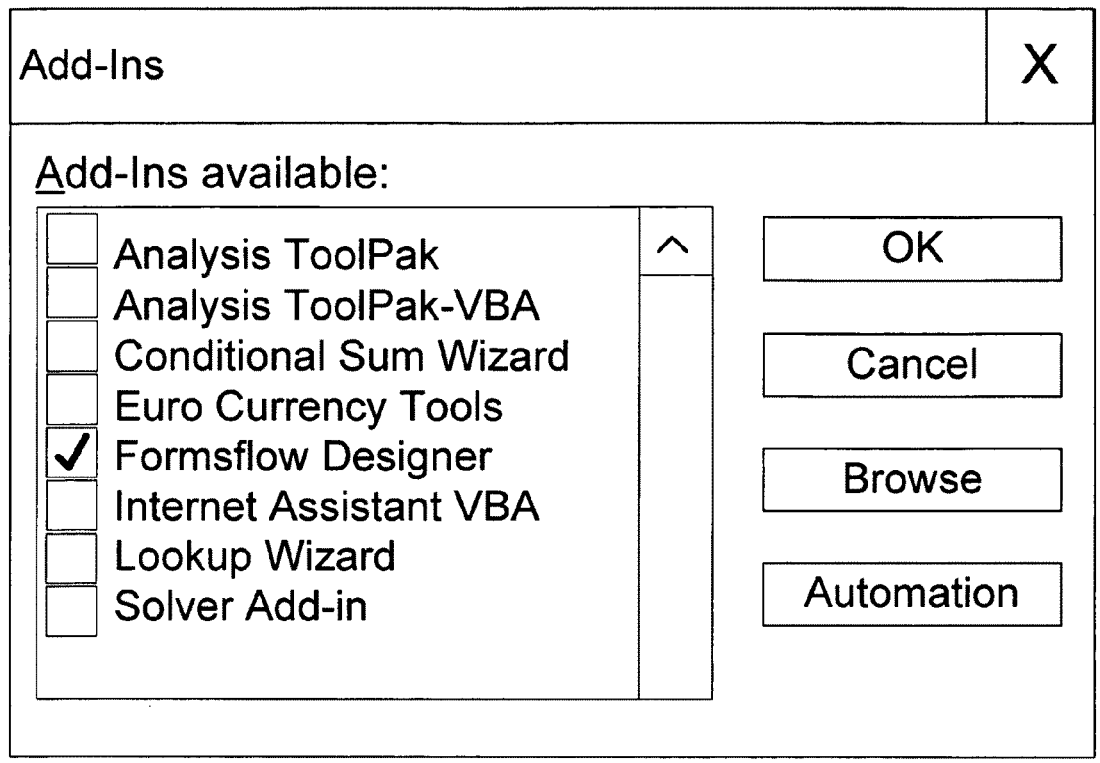

Installing the FormsFlow Designer Add-in—FIG. 12—The FormsFlow Designer excel Add-In will be sent to authorized individuals. With reference to FIG. 12, after receiving the file, users follow the following instructions to add to Excel: from the Excel Tools Menu, select Add-Ins; browse to find the FormsFlow Designer excel; select add-In file that was emailed to the user; click OK; return to the Add-ins screen and be certain that FormsFlow Designer is checked.

Figure 13:
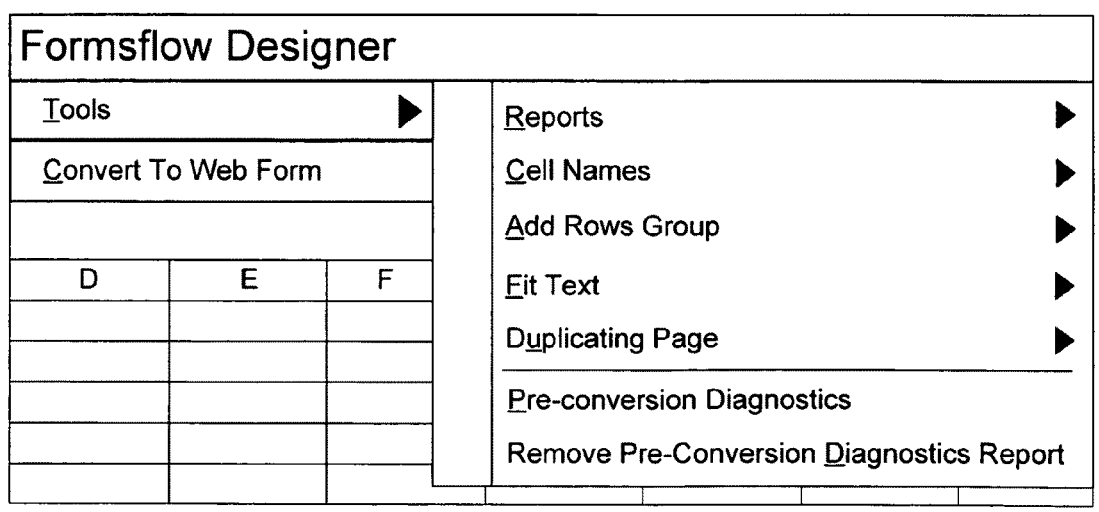
FIG. 13 is a screen shot of FormsFlow Designer menu, which is added to Excel upon installation and provides access to various tools and features.

FormsFlow Designer Menu—FIG. 13—After installation of the FormsFlow Designer Add-In, a menu will be added to Excel labeled FormsFlow Designer. From this menu, users will have access to: Reports; Tools to format the spreadsheet; diagnostic Tests; and Convert to Web Form. Cell names Menu—The Cell names menu holds tools that allow user to: mark Input Cells; mark Computed Cells; assign Repeating Cell Names; automatically Create Cell Names; and rename Cells. The goal of properly formatting Excel spreadsheets is to ensure that once it has been distributed to a variety of entities, data providers can quickly and accurately complete the forms and data collected remains organized and easily accessed. The first step in preparing an Excel spreadsheet is to identify and mark those cells that will be receiving input from an end-user. No other FormsFlow Designer tool can be applied to a cell until that cell has been marked.

Figure 14:
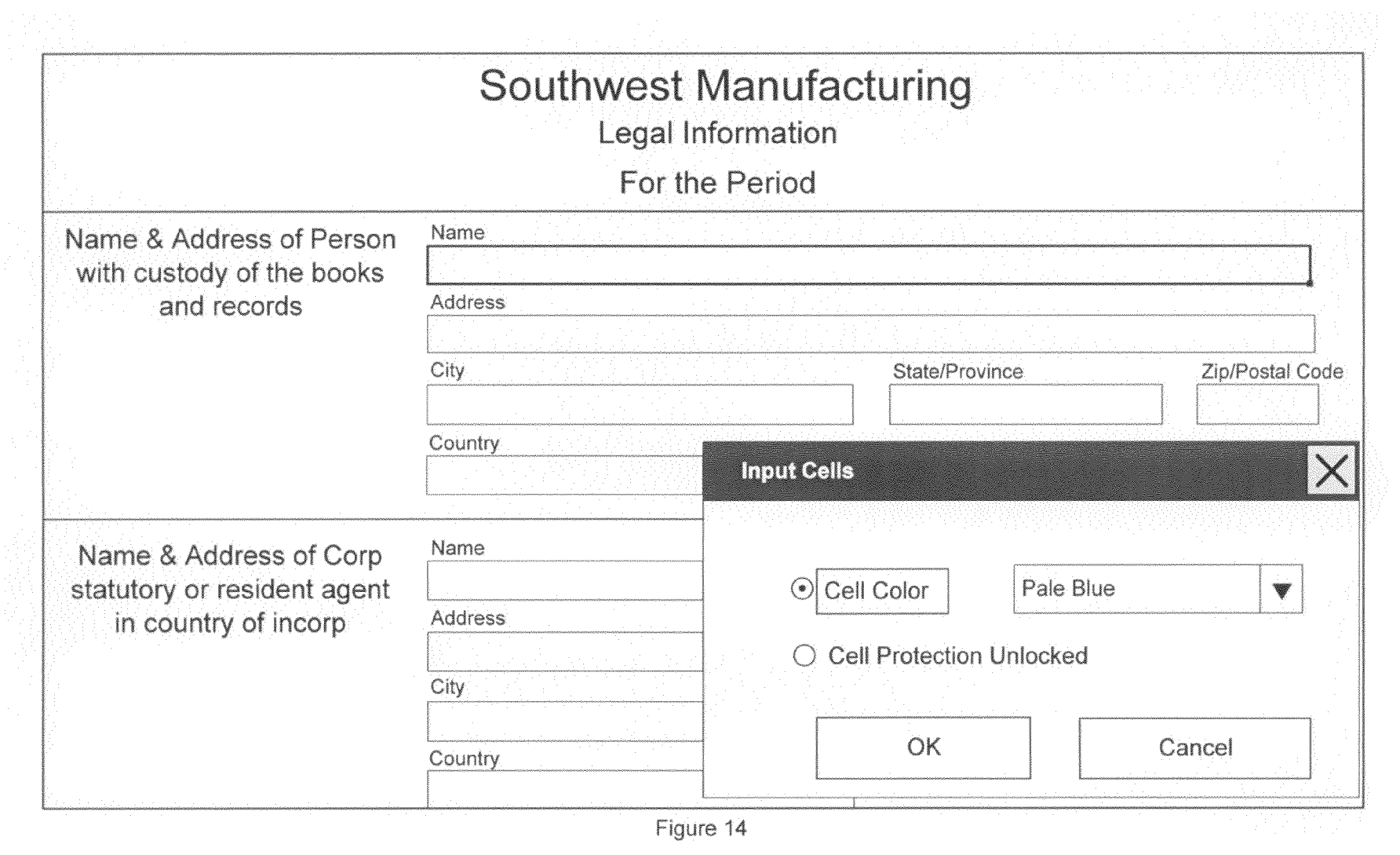

Mark Input Cells—FIG. 14—To define and mark input cells, the user: 1) selects the input cells in your worksheet; 2) uses the Excel Formatting toolbar to choose and assign a color to the selected input cells and apply that color; 3) on the FormsFlow Designer menu, select Tools, and then point to Cell names; 4) click Mark Input Cells to open the Input Cells dialog box; and 5) in the Cell Color drop down list, select the color assigned to the input cells, and then click OK. The Mark Computed Cells feature may be combined with the Mark Input Cells.

Figures 15, 16:
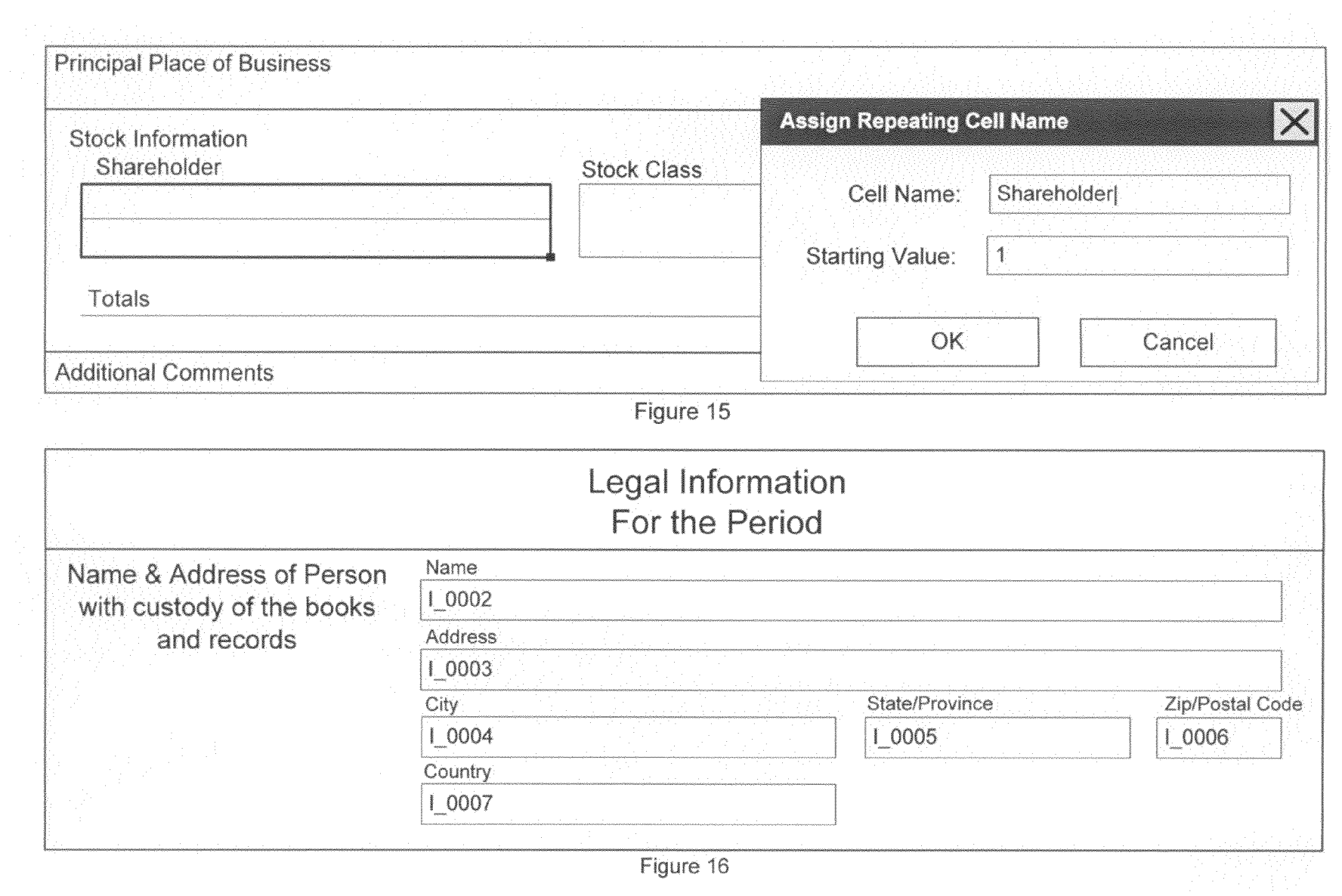

Assign Repeating Cell names—FIG. 15—Using the Assign Repeating Cell name feature users can select a range of input cells to share a similar name. For example, an input field is named "Shareholder" but there will be more than one and the user wants the same Cell Name applied to each entry, while at the same time differentiating between each entry. This is easily achieved with FormsFlow Designer. FormsFlow Designer assigns the cell name chosen, in this case "Shareholder", with a numerical suffix, i.e., Shareholder.001, Shareholder.002, etc. To assign similar names to a range of input cells the user may: 1) select the input cells to be assigned similar names (cells must first have been marked); 2) on the FormsFlow Designer menu, point to Tools, then Cell names; 3) click Assigning Repeating Cell names to open the Assign Repeating Cell Name dialog box; 4) in the Cell Name text box, type the name to be assigned; 5) in the Starting Value text box, type the starting number for the numerical suffix; and 6) click OK to assign the cell names. Note that this value increases by one for each subsequent input cell selected. If additional rows are added, they, too, will be assigned this name and a sequential number.

Automatically Create Cell names—FIG. 16—The Automatically Create Cell name command assigns incremental names to all marked cells. Cells must first have been marked. This tool quickly and easily ensures that each input cell has a unique name under which data will be stored. (users can also input names manually, but this tool helps avoid errors due to duplicate names). To assign names to the input cells automatically: 1) On the FormsFlow Designer menu, point to Tools, and then point to Cell names; and 2) Click Automatically Create Cell names to assign the cell names. Preferably all marked input cells in the workbook will receive a unique name. The "Remove automatic Cell names" command deletes the cell names assigned using the Automatically Create Cell names command. To remove the assigned cell name: On the FormsFlow Designer menu, point to Tools, Cell names, and then click Remove Automatic Cell names.

Rows Group—FIG. 17—The Add Rows Group feature helps define the areas in worksheets where, after converting the form to web format, end-users can add as many rows as needed, such as for a series of depreciable assets or a list of shareholders. The Add Rows Group command is used to define a set of rows as Rows Group. Users must first Assign Repeating Cell names to the cells to be added to the rows group. To create a Rows Group: 1) select the cells you want to add to the Rows Group (select at least two rows to create a Rows Group); 2) On the FormsFlow Designer, point to Tools, and then point to Add Rows Group; 3) Click Create. The selected rows are annotated with "Add Rows" caption. Using the Remove Rows Group command, a user can remove a single Rows Group or remove all the Rows Group defined in the Excel worksheet. To remove a "SPECIFIC ROWS" group from a worksheet: 1) Select the cell or merged cells you have defined as a Rows Group; 2) On the FormsFlow Designer menu, point to Tools, and then point to Add Rows Group; 3) Click Remove Selected. To remove ALL The ROWS groups defined in the worksheet: 1) select the cell or merged cells you have defined as a Rows Group; 2) On the FormsFlow Designer menu, point to Tools, and then point to Add Rows Group; and 3) Click Remove All from Active Worksheet.

Fit Text—FIG. 18—The Fit Text command helps accommodate large amounts of text within a designated text area. Using the Fit Text command readjusts the text area to display all the text entered into the form. A Fit Text button is added next to the area defined after the worksheet is published to web form. With this "Fit Text" feature invoked, end user comments can be as large as they deem appropriate to support any tax position. The Create a Fit Text Area command is used to define a Fit Text area by: 1) Select a cell or merged cells you want to define as fit text area; 2) On the FormsFlow Designer menu, point to Tools, and then point to Fit Text; 3) Click Create. The selected cells are annotated with Fit Text caption in the worksheet. The Remove Fit Text Area command is used to remove a Fit Text area from your worksheet by: 1) Select a cell or merged cells you want to define as Fit Text area; 2) on the FormsFlow Designer menu, point to Tools, and then point to Fit Text; 3) Click Remove Selected. (User may remove all the Fit Text areas from the current worksheet by selecting Remove All From Active Worksheet).

The Duplicating Page feature helps specify duplication of the Excel worksheet. To Create a Duplicating Page, the user uses the duplicating feature by: 1) Set the print area using the Print Area options on the Microsoft Excel File menu; 2) On the FormsFlow Designer menu, point to Tools, and then point to Duplicating Page; 3) Click Create to define the page as a duplicating page. Once duplicated, a message may appear at the top of a page/screen. The added worksheets will have all input cells renamed with a prefix to distinguish them from the input cells on the first worksheet. For example, if a cell is named Co_name on the first worksheet, it will be named P02.Co_name on the first duplicated worksheet, P03.Co_name on the next duplicated worksheet and so on. The Remove Duplicating Page command is used to disable the duplicating page feature for a worksheet by: 1) on the FormsFlow Designer menu, point to Tools, and then point to Duplicating Page; and 2) Click Remove.

Range name Report—FIG. 19—FormsFlow Designer will generate a report in the form of an additional tab to automatically document input cells and their respective range name.

This information is useful for diagnostic purposes as well as to write Excel macros to extract tax data from the related spreadsheet. The Range name Report adds a worksheet similar to the subject form with Rpt as a prefix. This new worksheet displays the cell names assigned by the user. The Create Range name Report command creates a duplicate worksheet for all the worksheets in the Microsoft Excel file. Users may use the Remove Range name Report command to delete all the reports generated at the same time. The Create Range name Report feature may be used to generate a Range name Report by: 1) on the FormsFlow Designer menu, point to Tools, and then point to Reports; 2) Click Create Range name Report to create a report worksheet for all the worksheets in the user's Excel file. Only one name per cell is allowed. Should there be a cell with two names, use the Rename Cells command to change the name. The Remove Range name Report feature is used to delete the Range name Reports by: 1) On the FormsFlow Designer menu, point to Tools, and then point to Reports; 2) Click Remove Range name Report.

Pre-Conversion Diagnostic Report—The pre-conversion diagnostic report goes through the active worksheet and evaluates the worksheet for errors that users may encounter while converting the worksheet to the web format. The report provides error details such as location of the cell and the type of error. The Generate Pre-conversion diagnostic Report feature is used to generate a diagnostic report by: 1) On the FormsFlow Designer menu, point to Tools, and then click Pre-conversion Diagnostics; 2) On the Diagnostics dialog box, click Report to add the report to the Microsoft Excel file as a new worksheet; 3) Click the Reference link to locate the cell in your worksheet. The Remove Pre-conversion diagnostic Report feature is used to remove the pre-conversion diagnostic report by: On the FormsFlow Designer menu, point to Tools, and then click Remove Pre-conversion Diagnostic Report.

Convert to Web Form—FIG. 20—The Convert to Web form command publishes a user's Excel worksheet in a web format. When the user publishes the worksheet in web format all the grid lines from the worksheet are removed and only the content in the input cells can be modified by the user. To convert the Excel worksheet to web form: 1) On the FormsFlow Designer menu, click Convert To Web Form to open the Save As dialog box; 2) Type the name for your web form, and then click Save to save the web form.

Installation of FormsFlow Add-in for the Data Provider—FIG. 11—Notification of a DataFlow Request—when a DataFlow Request is created or assigned to a Data Provider, they receive a notification similar to the one indicated at FIG. 11. This notification details the Entity on which data is requested, the name of the FormsFlow Excel template required, and a deadline. In order to complete the FormsFlow Excel template, the Data Provider will need to install the FormsFlow Add-In.

Logging in to OWM—Existing OWM Users—Data Providers who are existing users of OWM should sign is normally and follow the directions below for Installing the FormsFlow Add-In. External Users—Data Providers not on OWM will need to go through the following steps to set their initial password: 1) Click the DataFlow Login link (see link circled in FIG. 11) to bring you to the OneSOURCE Login screen or go to a provided URL, e.g., https://workflow.onesourcetax.com/IWM/Login.aspx; 2) Type the user email address into the login area and click the "Forgot your password?" link—this may involve use of a temporary password, which is emailed to the user; 3) Upon receipt of the email, access the login screen again and enter email address and the password.

FormsFlow Add-in—FIG. 21—FormsFlow is a required Excel add-in that allows Data Providers of the DataFlow data collection system to enter data into Excel forms in a secured and controlled manner. FormsFlow enables the loading and saving of data entered in the Excel forms and allows users to perform actions such as adding rows, expanding text fields and duplicating pages in Excel forms that have been protected. Installation for external Data Providers, the FormsFlow Add-in is installed by first clicking on the "Download FormsFlow Add-in" link on the Dataflow screen as seen on FIG. 21. For OWM users, the FormsFlow Add-In can be found on the Add-Ins page when you login to OneSOURCE WorkFlow Manager, refer to FIG. 6A. Once the link (or Download button) is clicked, the installation program will start. Users may have to allow the download based on their Internet Explorer security settings and should click Run if a dialog box appears. An Install Wizard or the like with License Agreement screens may be used and the user checks a radio button to accept the terms of the license agreement and then the install program will finish the installation.

Figure 22:
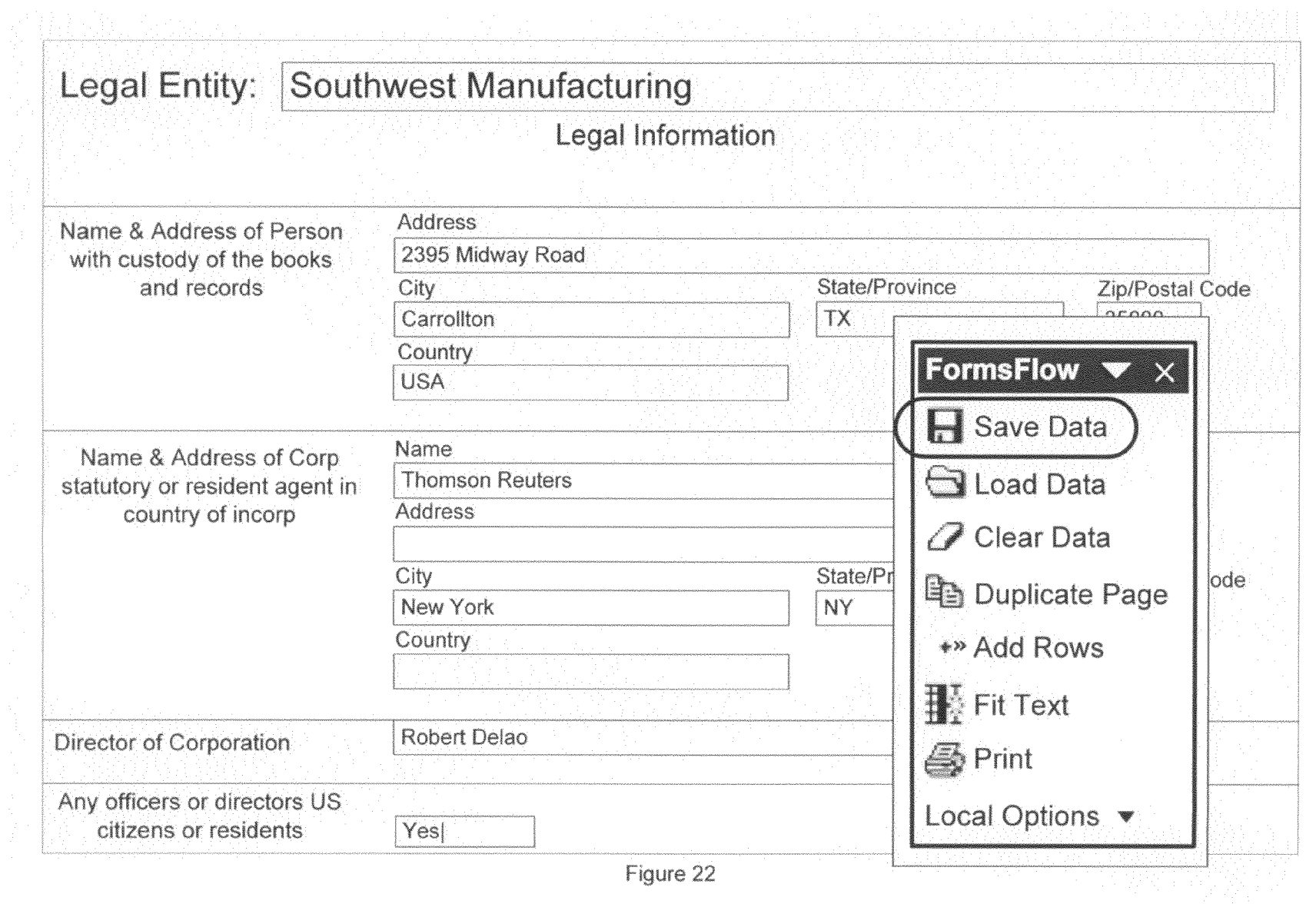

How to Complete a FormsFlow Web-based excel Template—FIG. 22—FormsFlow Menu—The FormsFlow menu is added to the Excel menu bar and is also displayed as an Excel tool bar as shown in FIG. 22. The Save Data command saves the information that is entered into the form back to the Central Web Database. This option should always be used to save data. Alternatively, using the traditional Excel File-Save menu will also save data back to the Central Web Database. The Load Data command reloads the amounts saved in the Central Web Database back to the form. When a file is opened after the initial Save, the form is displayed with the latest data. Typically, the Load Data command is primarily used to repopulate the form in the event of errors. Note: this will overwrite any information that has not been previously saved to the server. The Using Add Rows command allows for additional rows to be added to select groupings of data in the workbook which will be denoted by "Add Rows" next to the rows. To add a row to the group: 1) Click on any cell within the Add Rows group. Make sure the cursor is still not in data entry mode (i.e, the cursor should not be blinking), just a cell is selected; and 2) Click on Add Rows in the FormsFlow menu. A new row will be added and you can enter information.

Using Fit Text—Referring to FIG. 18, cells that are denoted as "Fit Text" allows the user to enter more data than the original size of the cell. To fit all the text within the cell: 1) Type all information to be included in the cell; 2) Click on the cell. Make sure the cursor is still not in data entry mode (i.e, the cursor should not be blinking), just the cell is selected; 3) Click on Fit Text in the FormsFlow menu. The cell will be resized to view all the text entered. The Clear Data command is used to remove the information from the page a user is viewing.

A Duplicate Page feature may be provided to allow page duplication. A new sheet will be inserted with the name of the original worksheet and a number inserted next to it to indicate the next page. The duplicate sheet will contain the same data entered as the sheet it was duplicated from. To remove all the data from the new sheet, click somewhere on the sheet and select Clear Data from the FormsFlow menu or toolbar.

Figure 24:
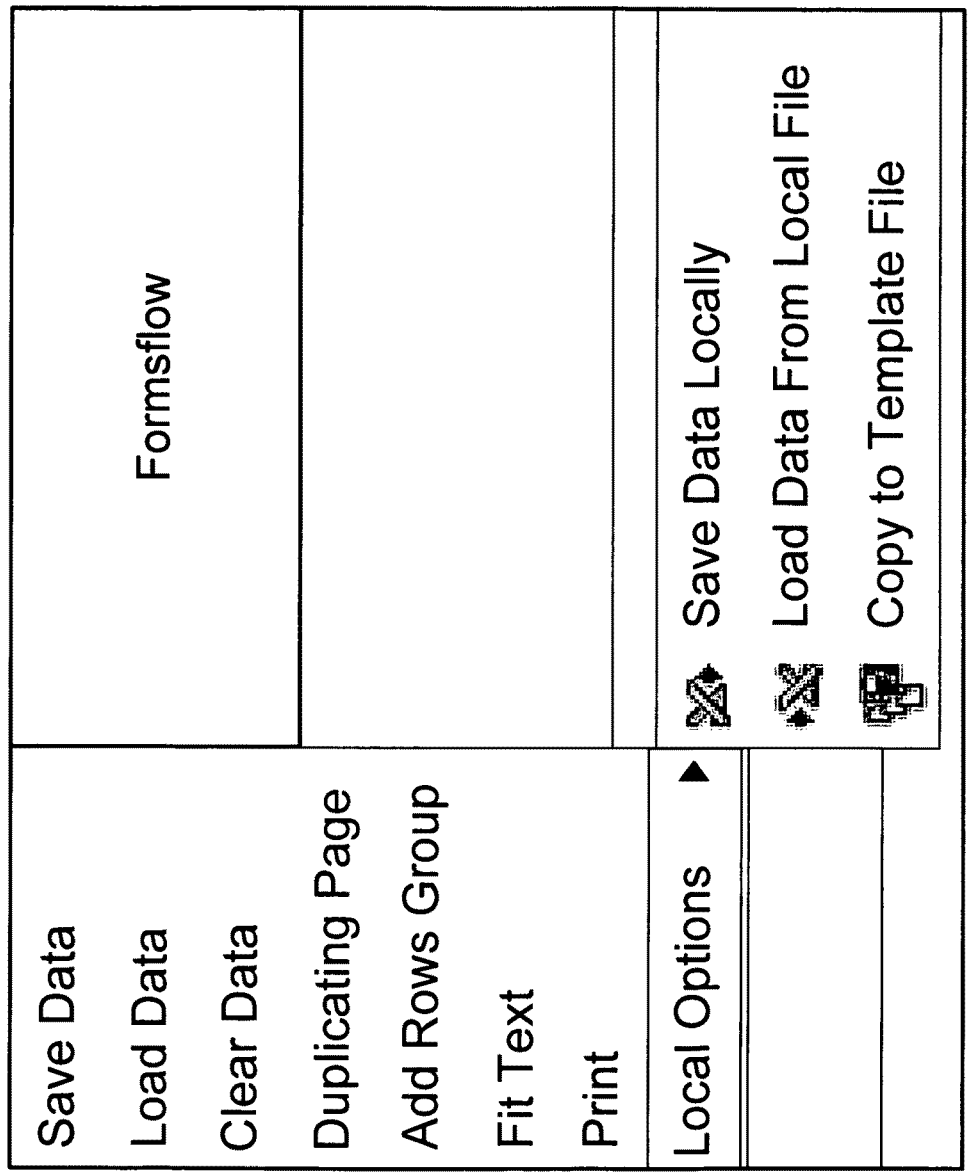
FIG. 24 is a screen shot of the Local Options commands contained within the FormsFlow menu.

Local Options—FIG. 24—These options are available, while in process, to save the template and data on a local drive and not to the OWM server. For example, if a user plans to work on the file without Internet access. This option allows users to enter your information over a period of time and continue to save locally for later saving on the OWM server. The Save Data Locally option prompts users with a file selection dialog box where a user can identify the folder and file name. The filename defaults to the <EntityID>_<EntityName>_<TemplateName>_<year>.xml. The Copy to Template File option saves the template without data to your local drive as follows: 1) Select Copy to Template File, a dialogue box will open to remind you to Save Data Locally, click OK (note: To work locally you must save using the command Save Data Locally); and 2) Select a folder and filename. Click Save. The template filename has a default name that you can change, but you must save it as file type xls. To Open the Form Locally: 1) Open the template file you saved locally (.xls) in Excel; 2) from the FormsFlow menu or toolbar, select Local Options, click on Load Data From Local File. This opens the screen below prompting you to select the .xml file you saved data to locally. Once the .xml is opened the data will be loaded to the .xls form you have opened. Continue to enter data. When ready to save: 1) Select Local Options, Save Data Locally; 2) User will be prompted with the existing filename, to save the new data entered, click Yes.

Load Data From Local File—to save from local drive to the server do the following: 1) Login to OneSOURCE DataFlow; 2) Select the appropriate form in the DataFlow grid; 3) The data last saved to the server will show up in the form, to overwrite this old data with the new data saved locally, select Local Options from the menu or toolbar, then Load Data From Local File; 4) Click Save Data from the FormsFlow menu or toolbar and this will save the information to the server.

Attaching supporting documentation—To add or view documents click the "Documents" button found on the Data-Flow request grid. This will open the DataFlow Documents screen, shown below, where the user can add documents. The top left of the popup displays the details of the DataFlow Request to which documents are related. To add a document: 1) Enter a description for the document (required) This description will be used as an index to search for files under the documents section of OWM; 2) Click Browse and select document; 3) Click Save. The document will be displayed in the grid. Double click on the document row to open the attached document in read only mode. To delete the document, click the delete link in the grid row and you will be prompted to continue deleting the document.

Leaving notes for HQ—To add or view notes, click the Notes" button found on My DataFlow Requests screen. This will open the DataFlow notes screen where users can enter notes. The top left of the dialog window displays the details of the DataFlow Request to which the note is attached. To add a note: 1) type the note into the Add note section of the screen, a resolution can be entered as well. If the note is resolved, click Closed to check the box; 2) Click Save to add the note and it will display in the grid. Double click on the row to open the note and it will display in the Edit Note section of the screen. Users can edit the note and click Save to attach the updated note. The updated note will be displayed in the grid. To delete a note: click on the Delete link on that row of the note. To make changes to the converted Excel data file after the initial DataFlow email Request has been made: Open the original non-converted .xls file, make changes, Convert to Web Form again and save to the same template name used before. Go back into Setup, DataFlow, and open the Forms-Flow template associated with this file. Browse and select the revised converted FormsFlow file (same filename used in original setup) and click Save. This saves the new request and updates the recipient's requests automatically without having to resend the requests again.

DATA EXTRACTION—The OWM DataFlow software includes a Data Extraction component that aids in facilitating data transfer to and from the Central Server Database or repository and Excel worksheets and DataFlow templates in the web-based data collection and processing function. Terms associated with the Data Extraction component include the following. DataFlow Repository—the central web storage where data from all DataFlow requests is held for secure access by Data Providers and end users. Entity—the target of the DataFlow request. Entity ID—the unique number assigned to each Entity. Excel Template Name—the custom Excel file converted into a web-based format using Forms-Flow Designer. Template ID—the unique id number assigned to a specific FormsFlow Excel Template. Request ID—the unique number that identifies a specific DataFlow request in the database. This id is returned in the first column by the DFGetList( ) function and as a single value by the DFGetID( ) function. Tag Range—a list of XML tag names (entered in the FormsFlow template as range names) that are to be, depending on the function, either retrieved from or written to the database. Output Range—a row or column of the same dimensions as the Tag Range that specifies where the data from the request is to be displayed/written. Repeating Tag Root—the range name, not including the incremental prefix or suffix, for a duplicating page or repeating value (add rows) group.

OWM DataFlow provides add-in formulas that allow Excel users to retrieve and manipulate data from one or multiple requests. This can also be used to extract data for importing into tax system or integrate with Excel models. The OWM-DataFlow Data Extraction Tool is an Excel Add-In that allows end users to query and report on information stored in the DataFlow repository. In one embodiment this tool includes an Excel Menu-bar item and a series of functions that assist in the retrieval and display DataFlow data. The functions include the following:

DFGetList( )—used to query the DataFlow database using the workflow fields associated with each request; retrieves list of outstanding data requests on the server DFGetID( )—similar to DFGetList( ) however, this function will return a single ID. returns the request ID (used by other formulas) of a specific request DFGetValues( )—used to extract specific values from the DataFlow database for a specific request. returns entered values for a specified list of data tags DFGetSingleValue( )—returns a single value for the specific request id and tag.

DFGetRepeatingValues( )—gets all values associated with a repeating range name on a request form. returns the repeating variables for a specified tag DFGetMultiPageValues( )—used to get information from requests that use the duplicate page functionality in Forms-Flow. returns the page variable for the specified tag DFGetXML( )—returns all tags and values (all data from the FormsFlow template) returns the XML data in two columns for the specified request DFCreateTable( )—a combination of the DFGetList( ) and DFGetXML( ) functions. returns the XML for all queried requests in a three column table DFPutValues( )—used to insert specific values into the DataFlow database for a specific request. Pushes a list of values to the server for a specified request DFPutSingleValue( )—inserts a single value into the database Pushes a value up to the server for the specified request DFWriteCSV( )—used to export information contained in an Excel spreadsheet Specifies a range that is to be written to a CSV file DFLoadWildcard( )—Loads a wildcard (similar to repeating value) range for a request DFLoadRange( )—Loads a range of cells using range names that match DataFlow XML tags DataFlow Menu—FIG. 25—When the DataFlow menubar is selected, the following choices are displayed. Retrieve data from server—this option processes all the DataFlow (DF) functions that retrieve data in the current worksheet. Unlike normal Excel functions, these functions do not automatically recalculate. They are only processed when this menu option is selected. Note: Processing is done in worksheet order moving down the columns in each sheet. It is necessary to execute DF functions in the proper order to achieve the desired results. Send data to server—this option processes all the DF functions that send data back to the server and update the database. These functions are DFPutValues( ) and DFPutSingleValue( ) which will be discussed later. Write .CSV files—this option processes all DFWriteCSV( ) functions in the worksheet. These functions are used to write .CSV files from the data in the worksheet bypassing the traditional "Save As".CSV process in Excel. Batch Processing—this option displays the dialog and is used to process multiple DataFlow requests through the same logic. Batch processing can be used to roll data over from year to year in the DataFlow database or to write multiple requests out to .CSV files. Batch processing will be covered in greater detail in a later section of this document. Clear—this option is used to manually clear any temporary (cached).XML files containing information from the request database or to erase any .CSV files prior to writing new files. Setup—this option is used to configure the default settings for this workstation.

Figures 25, 28:
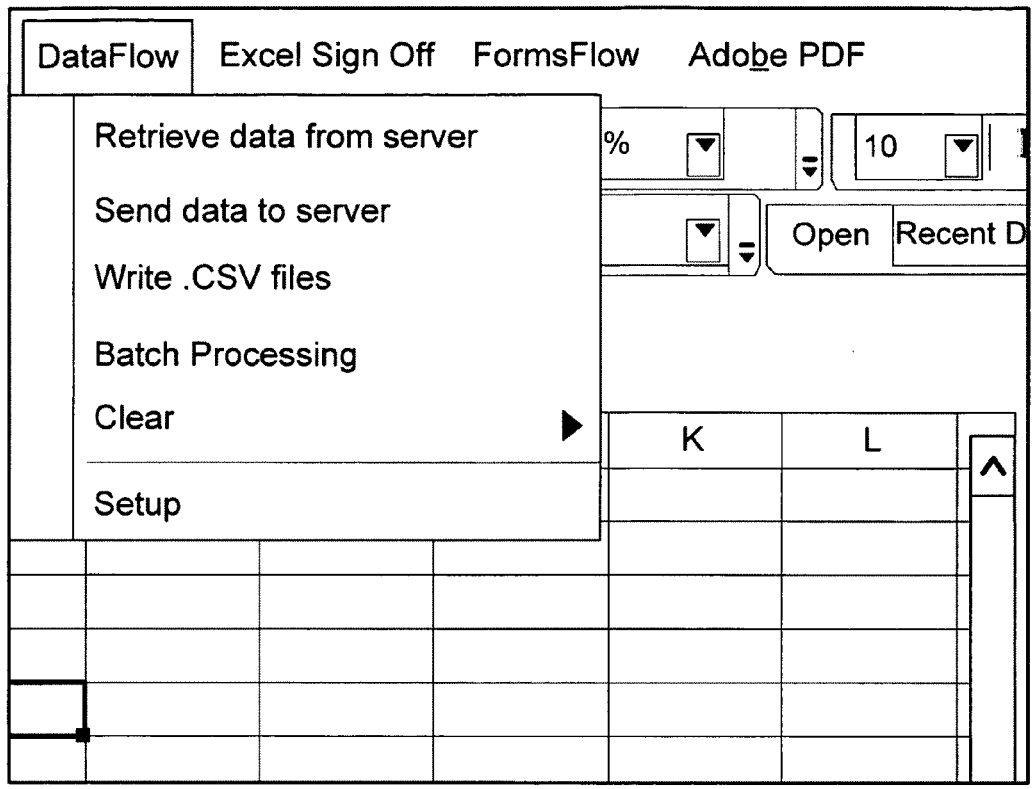
FIG. 25 is a screen shot of the DataFlow dropdown menu and the commands provided therein.
FIG. 28 is a screen shot of the Setup dialog box, which allows the user to perform certain functions related to the storage and update of temporary files.

When SETUP is selected a dialog is displayed, see FIG. 28, for user input of information. The user may perform the following functions. Folder for Temp XML files: Click the browse button to select a folder on your local computer to store temporary XML files that contain data from the server requests. This is done to reduce the number of times the DF functions need to go to the DataFlow repository to retrieve data. Storing temporary files locally significantly enhances the system performance. Minutes to keep Temp files: Enter the number of minutes to keep the temporary files. This allows one to determine how often the DF functions should go back to the server. If one is reporting on data that is changing often, this should be set to a lower number. If the data on the server is no longer being changed, this number can be increased. Clear Temp XML files at start-up: Instructs DataFlow to delete the temporary files each time Excel is loaded and the DataFlow Add-In is active. Checking this will ensure that you are always extracting the most updated values from the server. Do not use XML Temp files: Instructs DataFlow to always get data from the server and not to use the local data cache. This ensures that the data you are reporting on is current. This option will significantly slow down the system's performance and should only be used in cases where the data on the server (requests being reported on) are being updated often (daily). Folder for .CSV Output files: Click browse to select the output folder for .CSV files. Clear .CSV files prior to writing: Instructs DataFlow to always erase all .CSV files prior to writing new ones. Save Button: After all options are set, click to save these options for this workstation. (Each user can have different saved settings.) Cancel Button: Ignores changes and takes the user back to Excel work area.

Figures 29, 30:
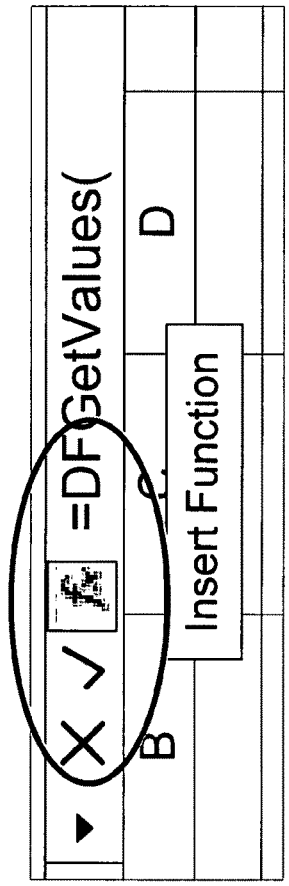
FIG. 29 is a screen shot of an Excel formula bar containing a DF function.
FIG. 30 is a screen shot of the Function Arguments help dialog box that appears when the function insert button is clicked for a cell containing a DF function.

DataFlow Functions—The DataFlow functions are used to specify what data to process for DataFlow requests. When a DF function is entered into Excel, see FIG. 29, the formula will display "Ready to run" in the cell that contains the function. After the function has been executed (by selecting Retrieve data from server from the DataFlow menu), it will display the date and time it has been run. Also, like all Excel functions clicking on the function insert button will display a function help dialog, see FIG. 30, naming all of the function's arguments.

FIG. 31 illustrates one embodiment of the DFGetList (<output range>, <entity id>, <entity name>, <Excel template name>, <template id>, <tax type>, <year>, <period>, <status>) function. This function is used to query the DataFlow database using the workflow fields associated with each DataFlow request. This function returns a list of requests that match the criteria entered at the cell specified by <output range>. Only a single value can be entered for each value (the query does not support and/or logic within a single argument). Entering a "%" in an argument acts as a wildcard. Entering % as part of the text of an argument will match all values that match the string prior to the %. For example, entering "Asia%" in the <entity name> argument will return all requests where the entity name begins with Asia. Entering the DFGetList function with only the output range argument will return all active requests in the database.

FIG. 32 illustrates one embodiment of the DFGetID(<entity id>, <entity name>, <Excel template name>, <template id>, <tax type>, <year>, <period>, <status>) function. Similar to DFGetList( ), however, this function will return a single ID in the cell in which the function is entered. For example: entering the formula of FIG. 32 returns the value indicated in FIG. 33. If multiple requests match the criteria entered in the function it will return #NA.

FIG. 34 illustrates one example of the DFGetValues(<request id>, <tag range>, <output range>) function. This function is used to extract specific values from the DataFlow database for a specific request. It can be used to build tables of data inside Excel where it can be processed using Excel's functions and formulas. <request id> is the unique number that identifies a request in the DataFlow database. This id is returned in the first column by the DFGetList( ) function and as a single value by the DFGetID( ) function, refer to FIG. 31. <tag range> is a list of XML tag names (entered in the FormsFlow template as range names) that are to be returned. <output range> is a row or column of the same dimensions as the <tag range> that specifies where the data from the request is to be displayed. If a tag value is not found in the database, an error will be displayed and the data will not properly be retrieved. A quick way to get the tag names for use in this function is to use the DFGetXML( ) function discussed herein and cut and paste the tag names from the returned list.

The DFGetSingleValue(<request id>, <tag>) function returns a value into the cell in which it is entered for the specific request id and tag. If the tag specified is not a valid tag for the request, #NA is returned.

FIG. 36 illustrates the DFGetRepeatingValues(<request id>, <repeating tag root>, <output range>) function. This function gets all values associated with a repeating range name on a request form. Repeating range names are identified as ranges with a numeric suffix. For example, I_CYMsInc.001 identifies current year misc income. On the FormsFlow template, this is a Add Rows Group and, therefore, the resulting data may have many values. Additional values are specified by the range name and an incremental suffix. In this example, the second line of the "Misc. Income" add rows group would be saved as I_CYMsInc.002. The <repeating tag root> is the range name up to but not including the period "." and, in this example, is "I_CYMsInc".

FIG. 37 illustrates the DFGetMultiPageValues(<request id>, <repeating tag root>, <output range>) function. This function is used to get information from requests that use the duplicate page functionality in FormsFlow. Each time a new page is created all the range names (tags) in the copied page are prefixed with the page number in the format Pxx, (xx is a two digit page number: P02, or page 2). In the example of FIG. 37, this function is being used to get partner names from a Sch K-1 form that uses the duplicate page functionality to allow users to enter multiple K-1 data per request. The <repeating tag root> is the range name not including the prefix and, in this example, "I_0007". FIG. 38 illustrates repeating values and duplicating pages can also be combined. In this case, DFGetMultiPageValues will return all pages and all repeating rows.

FIG. 39 illustrates the DFGetXML(<request id>, <output range>) function. This function will return all tags and values (all data from the FormsFlow template) to the location pointed to by <output range>. This function is useful for getting all information from a request and then further manipulating it with Excel formulas or Excel macros. This function is particularly helpful in getting valid range names (tags) for the DFGetValues( ) and related functions that rely on having accurate tag names in order to function.

FIG. 40 illustrates the DFCreateTable(<output range>, <entity id>, <entity name>, <Excel template name>, <template id>, <tax type>, <year>, <period>, <status>) function. The DFCreateTable( ) function is a combination of the DFGetList and DFGetXML functions. This function will extract all data for all requests that match the entered criteria and then build a table in Excel at the <output range> location that contains three columns: Request ID, Tag Name, Value. Once returned, this data can be used for further manipulation in Excel. Depending on the size and number of range names in the FormsFlow template and the number of requests that match the query criteria the numbers of rows that will be returns can be quite large and, in some cases, may exceed the capacity of Excel 2003 which is 65,536 rows.

FIG. 41 illustrates the DFPutValues(<request id>, <tag range>, <output range>) function. This function is used to insert specific values into the DataFlow database for a specific request. It can be used to load such information as balances from prior year requests (tax packages) or account balances from an ERP trial balance extract. You must use the Send Data to Server or Batch Processing choices in the DataFlow menu to process this function. <request id> is the unique number that identifies a request in the DataFlow database. This id is returned in the first column by the DFGetList( ) function and as a single value by the DFGetID( ) function. <tag range> is a list of XML tag names (entered in the FormsFlow template as range names) that are to be inserted or replaced in the database. If a tag value is not found, it will be created in the XML stored with the DataFlow request on the server. <output range> is a row or column of the same dimensions as the <tag range> that specifies the values that are to be written with the associated tags in the database. Blank values in the tag range or output range will be ignored.

The DFPutSingleValue(<request id>, <tag>, <value>) function inserts a single value into the database identified by the <tag> parameter with a value identified by the <value> parameter. If the tag specified does not exist, it is added to the database. If the tag is found in the database, the value is replaced. The Send Data to Server or Batch Processing choices are used in the DataFlow menu to process this function.

FIG. 42 illustrates the DFWriteCSV(<Output File Name>, <Value Range>, <Write Flag>, [Sequence], [Append Flag]) function. This function is used to export information contained in an Excel spreadsheet, that is using the DataFlow add-in, to a .CSV file. This allows the DataFlow system to integrate into almost any other system. The parameters are as follows. <Output File Name>—a text field that will be given to the CSV file being written. The extension of the file name will be .CSV. For example, if the <output file name> parameter was "trial balance", the resulting file name would be "trial balance.CSV". <Value Range>—identifies the range to be written to the CSV file. This range can contain selective columns and follows the general rules for naming ranges used by Excel. <Write Flag>—a range that contains a single column and the same number of rows as the <Value Range>. This range should contain True or False values. If the value in this range is True, the corresponding row will be written to the output CSV file. (A true value either contains the word True or a value of 1.) Use of this field eliminates sending zero values to the database or skipping lines that contain subtotals or suppressing blank lines from being written at the end of an output range. [Sequence]—an optional parameter with an integer value (1, 2, 3, 4 etc.) that identifies the sequence that DFWriteCSV( ) functions should be written. One could create spreadsheets where multiple tabs are writing value to the .CSV file. This parameter will make sure that the different ranges are written in the sequence determined by the spreadsheet designer. If omitted, the DFWriteCSV( ) functions will be executed in sheet, then column/row order. [Append Flag]—If True, if a file exists with the same name as specified in the <Output File Name> parameter, the value range will be appended to the existing file; If False, the output file will be overwritten each time the function is processed.

Batch Processing—FIGS. 43-47—Batch Processing is a feature that allows users to create an extraction worksheet that can be run for multiple requests that can be configured to: Roll over data; Create CSV files for importing to other applications; Push data into requests from GL or ERP systems; SDK (software development kit); Allow software developers to leverage the ONESOURCE DataFlow database to integrate with other applications; Provide functions and code samples for: Listing all requests in the database; Retrieving XML data from the ONESOURCE DataFlow database; Saving XML data to the ONESOURCE DataFlow database.

Figures 43, 44, 45:
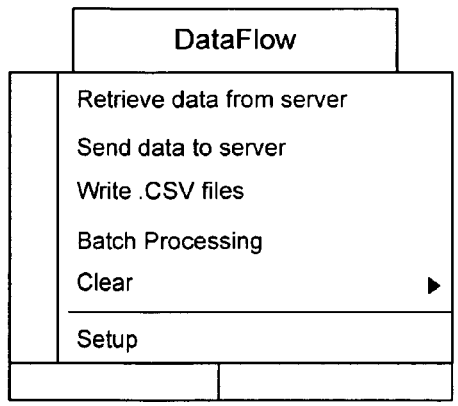
FIG. 43 is a screen shot of the Batch Processing command provided in the DataFlow menu in Excel.
FIG. 44 is a screen shot of the Batch Processing dialog box that appears when the Batch Processing command shown in FIG. 43 is selected.
FIG. 45 is a screen shot of the Batch Processing dialogue box when actively selecting or editing the Request ID list range.

Batch processing is a command that is used to allow a single extraction spreadsheet to automatically process data for a number of requests. As an example, this type of processing can be used to write a single CSV file from multiple requests or to rollover amounts from prior year requests. However, it is not limited to just these functions. As illustrated in FIG. 43, Batch processing is accessed from the DataFlow menu in Excel. When selected the dialog box of FIG. 44 will appear. "Range that contains the list of Request IDs" field contains a range that contains a list of request IDs. It is easiest to use the list of IDs that is returned in the first column of the output of a DFGetList( ) function. Click on the button to the right of the field (see arrow) to use the Excel pointing capability to assign the range. "Cell to hold the current Request ID while processing" is a single cell that will have the current request ID pasted into it for each cycle through the batch. FIG. 46 illustrates entering the "Cell to hold the current Request ID . . . " and FIG. 47 illustrates Formula referencing the cell that contains the request id.

The batch process works as follows. For each cycle (or each request ID specified) the system is going to take certain actions (which will be discussed below). In order for batch processing to work, all the functions that are retrieving data from the request database must reference this cell as the request ID needed for the function. In this way, as the system cycles through each request ID, the data can be retrieved for the different requests in the database.

Batch Processing Options include the following. Retrieve data from the server—This option retrieves data from the server and executes all DFGet functions that are in the worksheet. After all DFGet functions are run, the worksheet will be recalculated. Send data to server—This option processes all DFPut functions after DFGet functions are run. Write .CSV files—This option processes any DFWriteCSV functions that are in the workbook. Therefore, checking both Retrieve data from server and Write .CSV files option will tell the system to loop through all of the request IDs in the specified range and write a CSV file for each request. If the [Append Flag] is set to True in the DFWriteCSV function, this will force the system to create a single output file containing data for all requests. Similarly, by creating requests on the server for multiple years and checking the Retrieve data from server and send data to server options, one can roll data from year to year.

Installing the DataFlow.XLA Add-In and Working with Excel Add-Ins—To install the dataflow.xla Add-In and still be able to disable it when it is not needed, use the following procedure. Copy the dataflow.xla file to a place on your system hard disk (for example, My Documents\Excel Add-Ins). Access the Excel Add-In dialog using the Tools→Add-Ins menu. At the Excel Add-Ins dialog click the browse button and navigate to the folder that contains the Add-In. Add-In file selection dialog—Select the dataflow.xla add-in and click OK. The Add-In is installed and can easily be activated and deactivated by simply returning to the Add-Ins dialog box and selecting or deselecting DataFlow.

In one embodiment of operation, the DataFlow component opens a dataflow request in edit mode for all users attempting to view the same request. In the alternative, the system may be configured to permit only a single user to open the dataflow request in "Edit" mode. The system may then notify any additional users who are attempting to open the same request with a notification that the request is already in use by another user. The first user to open the request will have it in Edit mode/Checkout. When additional users attempt to access the same request by double clicking, the system may display an alert stating: "This request is currently being edited by <user id>. Click OK to open in Read-Mode." This may improve data input control and the system may be configured with a "limitation of checkout" feature to allow administrators to limit the duration of a single checkout. This prevents users from indefinitely having access to a particular DataFlow request. The system may include an "Override Checkout" command that allows administrators to remove DataFlow requests from checked out status. A FormsFlow range option and DataFlow functions increase efficiency and ease management of data across requests. In this way the system ensures users are working with the most current versions of FormsFlow and the DataFlow template and improves access time for DataFlow requests.

In one manner, the Check In/Out feature may involve providing a new column to the DataFlow grid providing Checkout details, e.g., the user, date and time. For Override Checkout and Duration of Checkout a field may be added to DataFlow templates where Administrators set the allowable time for Checkout. In addition, the Data Providers interface may include a "Checked Out By" column providing Checkout details: the user, date and time of checkout.

The present invention is not to be limited in scope by the specific embodiments described herein, It is fully contemplated that other various embodiments of and modifications to the present invention, in addition to those described herein, will become apparent to those of ordinary skill in the art from the foregoing description and accompanying drawings. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

I claim:

1. A computer implemented method of generating a set of tax schedule information comprising:
    (a) providing by a server comprising a processor and a memory an Excel interface, the Excel interface stored in the memory and being associated with a set of commands and functions;
    (b) accessing by the server a database separate from the Excel interface and the set of commands and functions, the separate database operatively connected to the server and storing a set of data received from the server and associated with a first time stamp, the set of data having been defined using the set of commands and functions;
    (c) manipulating the set of data by executing the set of commands and functions to generate a first set of tax schedule information and associating the generated first set of tax schedule information with a second time stamp;
    (d) storing the first set of tax schedule information with the associated second time stamp in the separate database; and
    (e) receiving by the database at least one additional set of data associated with a third time stamp, manipulating the at least one additional set of data by executing the set of commands and functions to generate a second set of tax schedule information and associating the generated second set of tax schedule information with a fourth time stamp and storing the second set of tax schedule information with the associated fourth time stamp in the separate database, whereby the first and second sets of tax schedule information with respective time stamps are adapted for later recall.

2. The method of claim 1 further comprising using at least one entry from either the first or second sets of tax schedule information to populate a tax schedule.

3. The method of claim 1 wherein the separate database is an XML database.

4. The method of claim 3 wherein both the first and second sets of tax schedule information are based, at least in part, on a set of tags associated with the XML database.

5. In a network-based system including a central server adapted to communicate with at least one remote computer, a workflow management system for generating a set of tax schedule information, the workflow management system comprising:
    a central server adapted to communicate with a remote computer over a communication network;
    a workflow manager module comprising a set of code executable by the central server, the set of code including a dataflow module adapted to process sets of data received from and sent to the remote computer, and including an Excel interface module being associated with a set of commands and functions and adapted to generate a network-based Excel template for presenting at the remote computer for entry and presentation of data; and
    a database having stored therein sets of data having been defined using the set of commands and functions, each of the sets of data stored in the database associated with a time stamp;
    wherein the central server receives data from the remote computer and the workflow manager module processes the received data according to the set of commands and functions to generate first and second sets of tax schedule information associated, respectively, with first and second time stamps and stores the first and second sets of tax schedule information in the database, whereby the first and second sets of tax schedule information are adapted for later recall.

6. The system of claim 5 wherein the workflow manager module is adapted to populate a tax schedule using at least one entry from either the first or second sets of tax schedule information stored in the database.

7. The system of claim 6 wherein the database is an XML database.

8. The system of claim 7 wherein both the first and second sets of tax schedule information are based, at least in part, on a set of tags associated with the XML database.

9. A computer implemented method for electronically handling shared and distributed access and revising of documents over a communication network, the method comprising:
  (a) electronically receiving by a computer a request for a document comprising data and functions;
  (b) providing in response to the request an Excel interface, the Excel interface being stored in a memory and associated with a set of commands and functions;
  (c) accessing by a computer a database separate from the Excel interface and the set of commands and functions, the separate database storing sets of data including a first set of data having been defined using the set of commands and functions, the first set of data associated with a first time stamp;
  (d) presenting remotely a document comprised at least in part of the first set of data; and
  (e) receiving for storing at the separate database a second data set associated with the document different than the first set of data and defined using the set of commands and functions, the second set of data associated with a second time stamp, and processing the received second set of data to generate a set of tax schedule information associated with the second time stamp, whereby the first and second sets of data with respective time stamps are adapted for later recall.

10. The method of claim 9 further comprising using at least one entry from either the first or second sets of data to populate a tax schedule.

11. The method of claim 9 wherein the separate database is an XML database.

12. The method of claim 11 wherein both the first and second sets of data are based, at least in part, on a set of tags associated with the XML database.

13. The method of claim 1, wherein the set of data further comprises at least a first set of data and a second set of data.

14. The method of claim 1, wherein the set of commands and functions comprises at least one of the group consisting of: DLGetList; DFGetID; DFGetValues; DFGetValues; DFGetSingleValue; DFGetMultiPageValues; DFGetXML; DFCreateTable; DFPutValues; DFPutSingleValue; DFWriteCSV; DFLoadWildcard; and DFLoadRange.

15. The system of claim 5, wherein the set of commands and functions comprises at least one of the group consisting of: DLGetList; DFGetID; DFGetValues; DFGetValues; DFGetSingleValue; DFGetMultiPageValues; DFGetXML; DFCreateTable; DFPutValues; DFPutSingleValue; DFWriteCSV; DFLoadWildcard; and DFLoadRange.

16. The method of claim 9, wherein the set of commands and functions comprises at least one of the group consisting of: DLGetList; DFGetID; DFGetValues; DFGetValues; DFGetSingleValue; DFGetMultiPageValues; DFGetXML; DFCreateTable; DFPutValues; DFPutSingleValue; DFWriteCSV; DFLoadWildcard; and DFLoadRange.

* * * * *

UNITED STATES PATENT AND TRADEMARK OFFICE
CERTIFICATE OF CORRECTION

PATENT NO. : 8,725,604 B2  
APPLICATION NO. : 12/589392  
DATED : May 13, 2014  
INVENTOR(S) : Michael Knighton et al.

Page 1 of 1

It is certified that error appears in the above-identified patent and that said Letters Patent is hereby corrected as shown below:

On the Title Page Item (75) should read,

Inventor: Michael Knighton, Lewisville, TX (US)  
Stan Guzik, Hoboken, NJ (US)

Signed and Sealed this  
Twenty-fourth Day of March, 2015

Michelle K. Lee  
*Director of the United States Patent and Trademark Office*